US009985771B2

(12) United States Patent
Olufunmilola et al.

(10) Patent No.: US 9,985,771 B2
(45) Date of Patent: May 29, 2018

(54) METHODS AND APPARATUS FOR COOPERATING BETWEEN WIRELESS WIDE AREA NETWORK RADIOS AND WIRELESS LOCAL AREA NETWORK RADIOS

(71) Applicant: QUALCOMM Incorporated, San Diego, CA (US)

(72) Inventors: Awoniyi-Oteri Omolade Olufunmilola, San Diego, CA (US); Soumya Das, San Diego, CA (US); Bongyong Song, San Diego, CA (US); Yong Sang Lee, San Diego, CA (US); Martin Stone, San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 14/149,544

(22) Filed: Jan. 7, 2014

(65) Prior Publication Data

US 2014/0146732 A1    May 29, 2014

Related U.S. Application Data

(63) Continuation-in-part of application No. 13/686,896, filed on Nov. 27, 2012.

(51) Int. Cl.
*H04L 5/00* (2006.01)
*H04W 52/02* (2009.01)
(Continued)

(52) U.S. Cl.
CPC ........... *H04L 5/0073* (2013.01); *H04W 24/10* (2013.01); *H04W 52/0212* (2013.01); *H04W 88/06* (2013.01)

(58) Field of Classification Search
CPC ............. H04W 36/14; H04W 36/0066; H04W 36/0022; H04W 36/0083; H04W 48/18;
(Continued)

(56) References Cited

U.S. PATENT DOCUMENTS 7,009,952 B1    3/2006 Razavilar et al.
7,171,199 B1    1/2007 Rahman
(Continued)

FOREIGN PATENT DOCUMENTS

JP    2013507068 A    2/2013
JP    2014503163 A    2/2014
(Continued)

OTHER PUBLICATIONS

Partial International Search Report—PCT/US2015/010371—ISA/EPO—dated Mar. 26, 2015.
(Continued)

*Primary Examiner* — Kwang B Yao
*Assistant Examiner* — Ricardo Castaneyra
(74) *Attorney, Agent, or Firm* — Paradice and Li LLP

(57) ABSTRACT

A method of wireless communication includes communicating using a first radio based on a first radio technology; configuring a second radio based on a second radio technology different from the first radio technology to assist the first radio with a first-radio operation; and performing at least a portion of the first-radio operation at the second radio. The first-radio operation includes at least one of multiple subscriber identity module (SIM) page monitoring and page/data processing, higher order diversity data acquisition and processing, interference measurement and management, E-UTRAN cell global identifier (ECGI) determination and reporting, a reference signal time difference (RSTD) measurement, beacon detection for small cell identification, a minimization of drive test (MDT) measurement, and a speed
(Continued)

estimation measurement. The first radio technology is a wireless wide area network (WWAN) technology and the second radio technology is a wireless local area network (WLAN) technology.

38 Claims, 15 Drawing Sheets

(51) Int. Cl.
*H04W 24/10* (2009.01)
*H04W 88/06* (2009.01)

(58) Field of Classification Search
CPC ..... H04W 24/02; H04W 24/04; H04W 24/10; H04W 72/0453; H04W 88/06; H04W 52/0212; H04W 64/00; H04W 72/0413; H04W 88/02; H04L 5/0073; H04L 27/2647

See application file for complete search history.

(56) References Cited

U.S. PATENT DOCUMENTS

| | | |
|---|---|---|
| 7,634,282 B1 | 12/2009 | McConnell |
| 8,005,026 B2 | 8/2011 | Zhu et al. |
| 8,311,543 B2 | 11/2012 | Dravida et al. |
| 8,472,980 B2 | 6/2013 | Khorashadi et al. |
| 8,483,242 B2 | 7/2013 | Han et al. |
| 8,532,605 B2 | 9/2013 | Bienas et al. |
| 8,565,686 B2 | 10/2013 | Shah et al. |
| 8,694,006 B2 | 4/2014 | Kobayashi |
| 2003/0218995 A1 | 11/2003 | Kim et al. |
| 2005/0191965 A1* | 9/2005 | Yu .......................... H04L 1/0026 455/67.16 |
| 2005/0266808 A1* | 12/2005 | Reunamaki .......... H04B 1/1027 455/101 |
| 2005/0271018 A1 | 12/2005 | Liu et al. |
| 2007/0242784 A1 | 10/2007 | Sampson et al. |
| 2008/0165709 A1* | 7/2008 | Soliman ............ H04W 72/0453 370/280 |
| 2008/0318577 A1 | 12/2008 | Somasundaram et al. |
| 2009/0042601 A1 | 2/2009 | Wang et al. |
| 2009/0227249 A1 | 9/2009 | Ylitalo |
| 2009/0310586 A1 | 12/2009 | Shatti |
| 2010/0067433 A1 | 3/2010 | Cheng et al. |
| 2011/0105112 A1* | 5/2011 | Cave ................. H04W 36/0083 455/424 |
| 2011/0105122 A1 | 5/2011 | Wu |
| 2011/0136498 A1 | 6/2011 | Ben-Eli et al. |
| 2011/0151874 A1 | 6/2011 | Olsson et al. |
| 2011/0194427 A1 | 8/2011 | Shirota et al. |
| 2011/0201279 A1* | 8/2011 | Suzuki .................. H04W 24/10 455/67.11 |
| 2011/0280141 A1 | 11/2011 | Chin et al. |
| 2011/0312288 A1 | 12/2011 | Fu et al. |
| 2012/0015667 A1* | 1/2012 | Woo ..................... G01S 5/0221 455/456.1 |
| 2012/0021725 A1 | 1/2012 | Rune |
| 2012/0088518 A1 | 4/2012 | Edge |
| 2012/0106506 A1 | 5/2012 | Taaghol |
| 2012/0231836 A1 | 9/2012 | Kuo et al. |
| 2012/0289276 A1 | 11/2012 | Hsu et al. |
| 2012/0289285 A1* | 11/2012 | Clevorn .................. H04B 1/16 455/552.1 |
| 2013/0083661 A1 | 4/2013 | Gupta et al. |
| 2013/0130687 A1 | 5/2013 | Kumar et al. |
| 2013/0223267 A1 | 8/2013 | Jung et al. |
| 2013/0344872 A1 | 12/2013 | Nukala et al. |
| 2014/0146691 A1 | 5/2014 | Soliman |
| 2014/0228016 A1 | 8/2014 | Futaki |

FOREIGN PATENT DOCUMENTS

| | | |
|---|---|---|
| WO | 2011041662 A1 | 4/2011 |
| WO | WO-2012046853 A1 | 4/2012 |
| WO | WO-2012099514 A1 | 7/2012 |
| WO | WO-2012110420 A1 | 8/2012 |

OTHER PUBLICATIONS

International Search Report and Written Opinion—PCT/US2013/071458—ISA/EPO—dated Apr. 15, 2014.
International Search Report and Written Opinion—PCT/US2015/010371—ISAEPO—dated Jul. 6, 2015.

\* cited by examiner

METHODS AND APPARATUS FOR COOPERATING BETWEEN WIRELESS WIDE AREA NETWORK RADIOS AND WIRELESS LOCAL AREA NETWORK RADIOS

CROSS-REFERENCE TO RELATED PATENT APPLICATIONS

This application is a Continuation-In-Part of U.S. application Ser. No. 13/686,896, filed Nov. 27, 2012, incorporated herein by reference in its entirety.

BACKGROUND

1. Field

The present disclosure relates generally to communication systems, and more particularly, to communications systems for cooperating between wireless wide area network radios and wireless local area network radios.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). These better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Many operators are planning to deploy many and different types of cells (e.g., small cells) on their networks to provide both coverage and capacity. Increasing the number of small cells in a network would result in significant increase in the number of measurements made by a mobile device. Due to limited resources on mobile devices, the increase in measurements would lead to degraded quality of service (QoS), poor mobility performance, etc. In addition, for certain applications, the performance of the network may be poor or even impossible to use for communication while using existing wireless wide area network radios.

SUMMARY

A method of wireless communication includes, but is not limited to any one or combination of, communicating using a first radio based on a first radio technology; configuring a second radio based on a second radio technology different from the first radio technology to assist the first radio with a first-radio operation; and performing at least a portion of the first-radio operation at the second radio. The first-radio operation includes at least one of multiple subscriber identity module (SIM) page monitoring and page/data processing, higher order diversity data acquisition and processing, interference measurement and management, E-UTRAN cell global identifier (ECGI) determination and reporting, a reference signal time difference (RSTD) measurement, beacon detection for small cell identification, a minimization of drive test (MDT) measurement, and a speed estimation measurement.

A system of wireless communication includes a first radio and a second radio. The first radio communicates based on a first radio technology. The second radio is configured based on a second radio technology different from the first radio technology to assist the first radio with a first-radio operation. The second radio is configured to perform at least a portion of the first-radio operation.

A method of wireless communication for a mobile device having at least a first radio and a second radio includes, but is not limited to any one or combination of, determining availability of the second radio; and performing, by the second radio, at least a portion of a first-radio operation otherwise performed by the first radio based on the availability of the second radio.

A method of wireless communication includes, but is not limited to any one or combination of communicating using a first radio based on a first radio technology; configuring a second radio based on a second radio technology different from the first radio technology to assist the first radio with a first-radio operation; and receiving, at the second radio, a signal related to the first-radio operation, the signal transmitted based on the first radio technology; and processing the received signal. The first-radio operation comprises at least one of multiple subscriber identity module (SIM) page monitoring and page/data processing, higher order diversity data acquisition and processing, interference measurement and management, ECGI determination and reporting, a reference signal time difference (RSTD) measurement, beacon detection for small cell identification, a minimization of drive test (MDT) measurement, and a speed estimation measurement.

DETAILED DESCRIPTION

Figure 1:
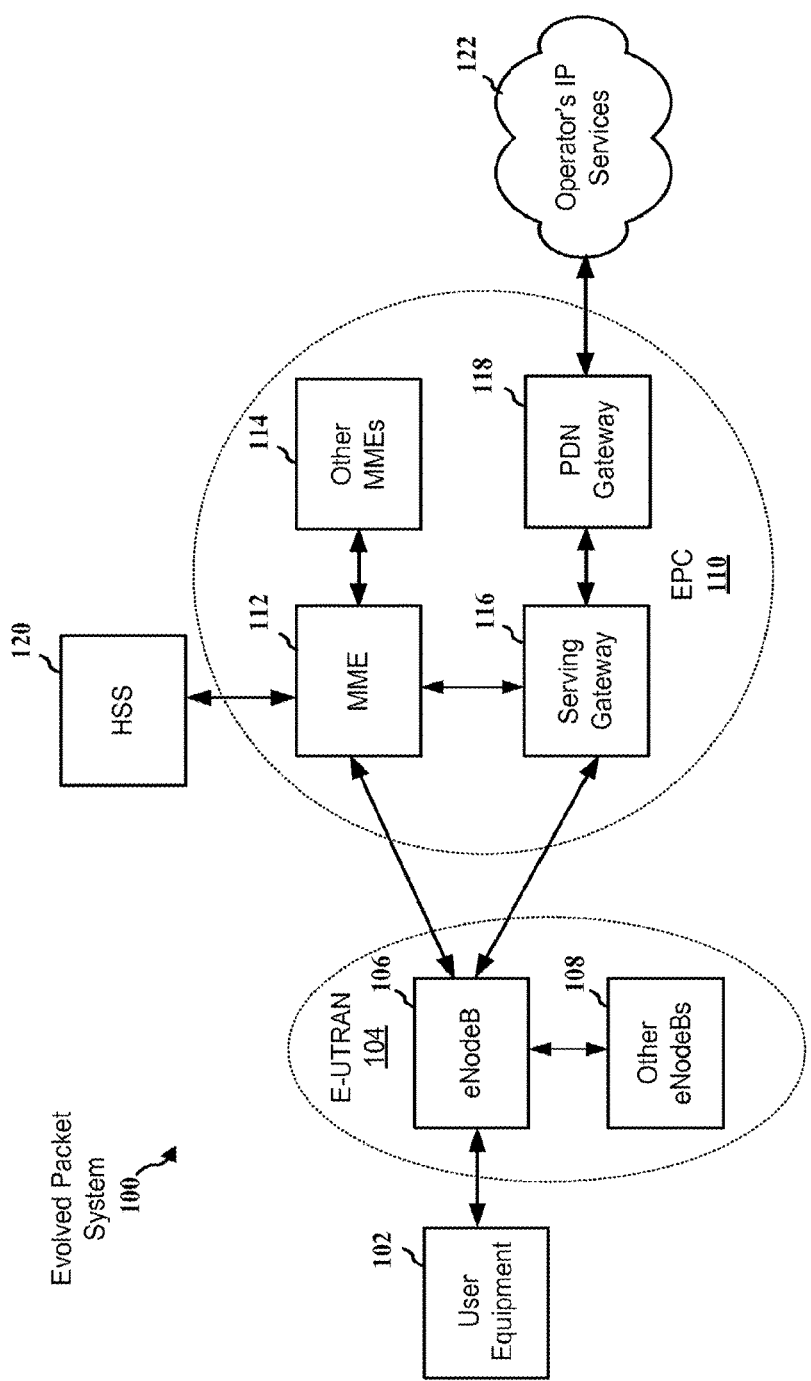
FIG. 1 is a diagram illustrating an example of a network architecture.

In various embodiments, a second radio, such as a wireless local area network (WLAN) radio, of a mobile device may coordinate with a first radio, such as a wireless wide area network (WWAN) radio, to assist the WWAN radio with a WWAN operation (also referred to as an application). In particular, the WWAN and WLAN radio of a mobile device may cooperate to assist the WWAN radio in various WWAN operations, including making measurements, estimation, data acquisition, detection, and decoding of WWAN signals. WWAN operations may include neighboring cell intra-frequency, inter-frequency, inter-RAT measurements; multiple subscriber identity module (SIM) page monitoring and page/data processing; higher order diversity data acquisition and processing; interference avoidance, coordination and mitigation; system information detection and decoding; reference signal time difference (RSTD) measurements; beacon detection for small cell identification; minimization of drive test (MDT) measurements; and speed estimation measurements. Some of the resulting benefits may include increasing user equipment (UE) throughput and system aggregate throughput, improving UE quality of service (QoS) (e.g., voice quality), improving mobility performance (e.g., increase in the handover success rate), reducing or eliminating the need for complicated network management, enabling simultaneous page and data reception on multiple SIMs mobile devices, and/or the like.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity, those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, wireless device, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
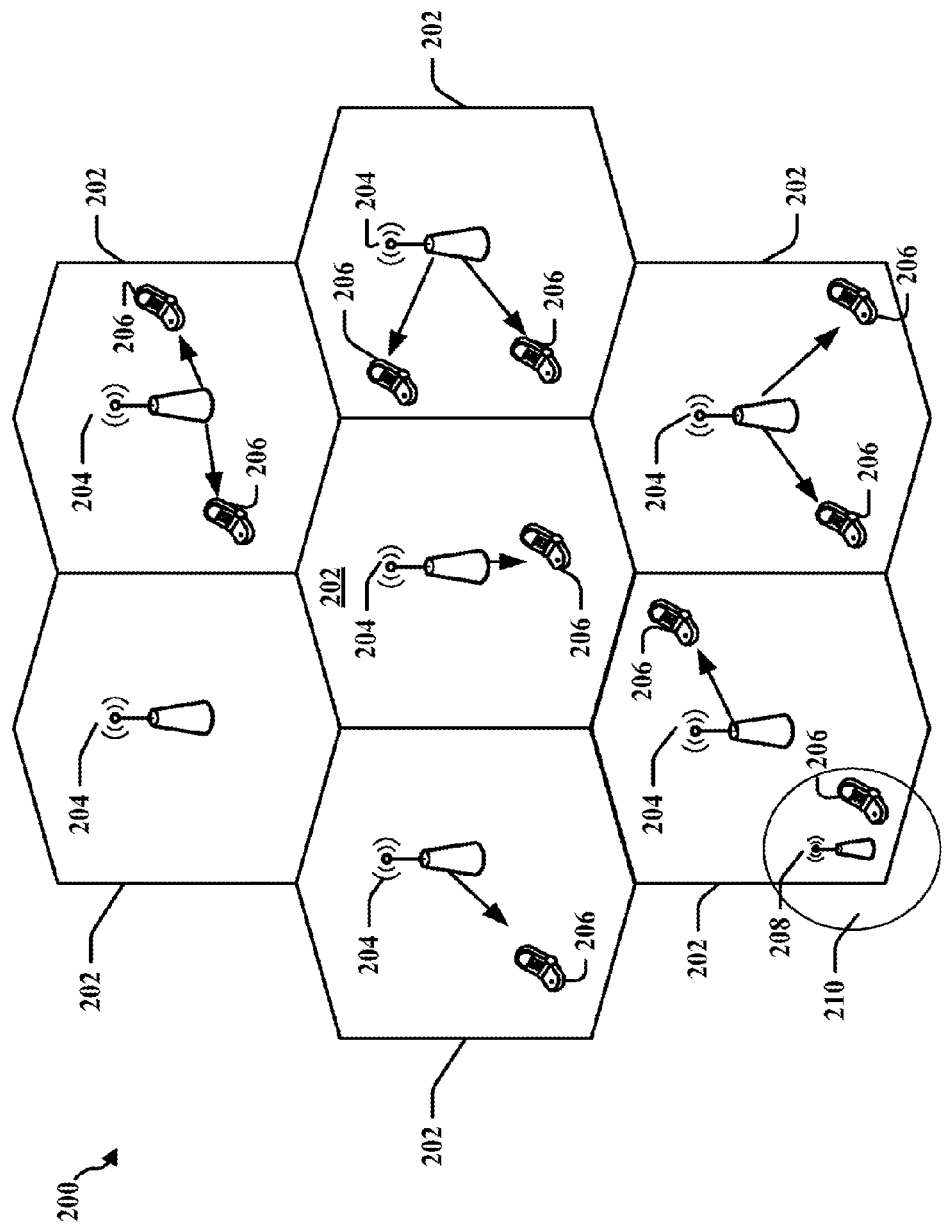
FIG. 2 is a diagram illustrating an example of an access network.

FIG. 2 is a diagram illustrating an example of an access network 200 in LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE, OFDM is used on the downlink (DL) and SC-FDMA is used on the uplink (UL) to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Figure 3:
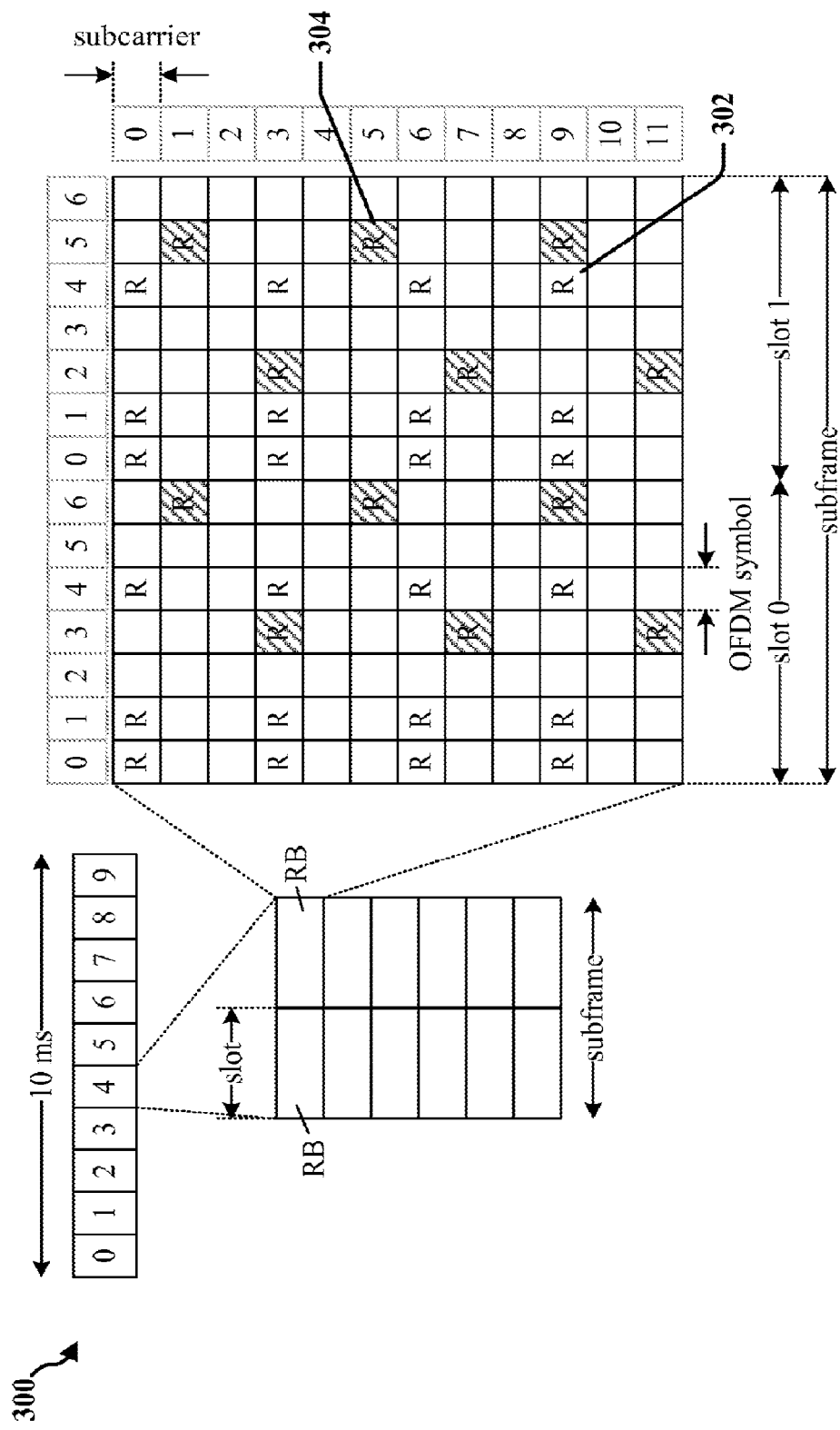
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 is transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
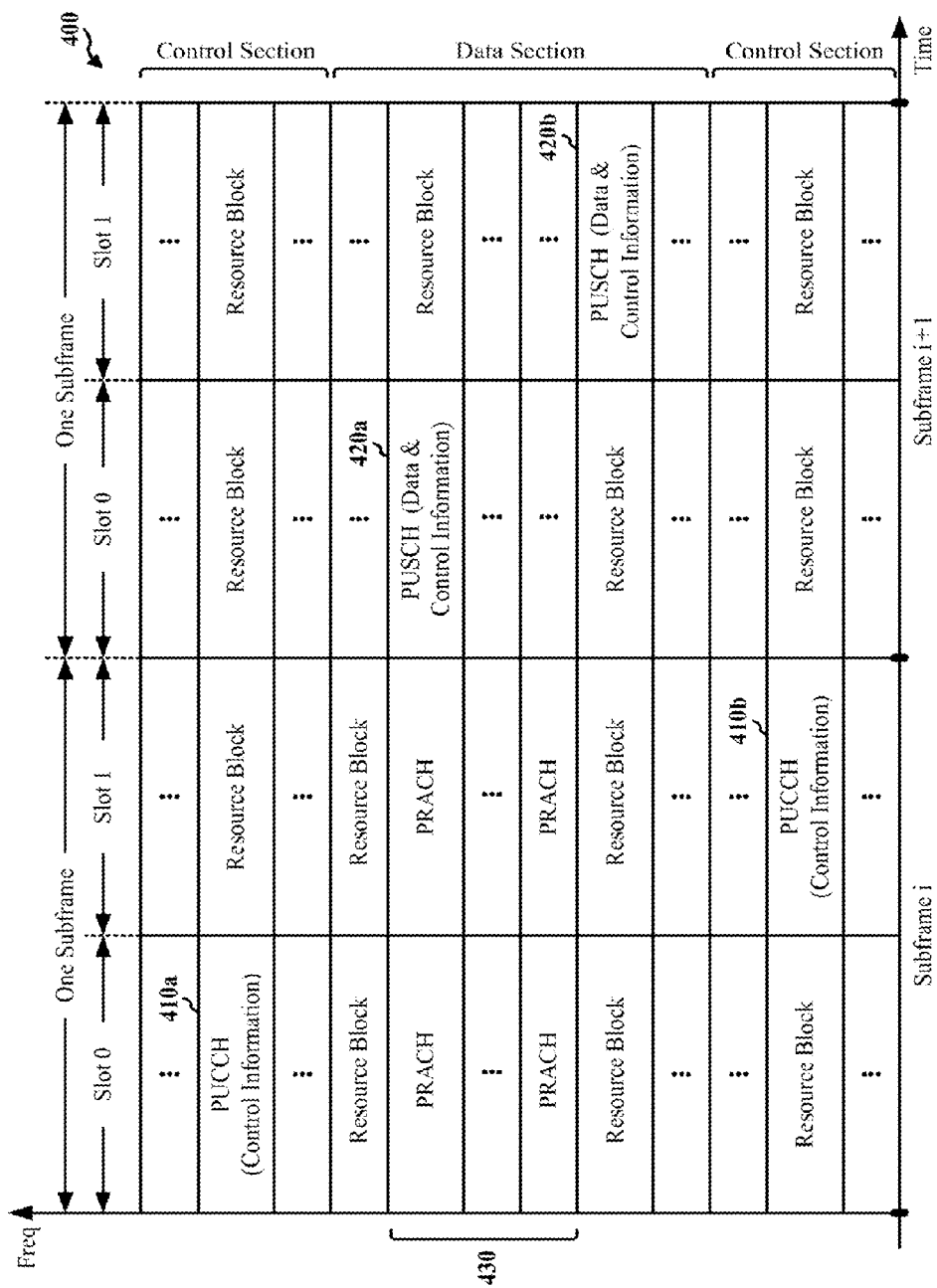
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

In cellular networks, when a mobile device moves from cell to cell and performs cell selection/reselection and handover, it has to measure the signal strength/quality of the neighboring cells. In this type of handover, the UE will assist in the handover decision by measuring the neighboring cells and reporting the measurements to the network, which in turn decides upon the timing and the target cell. The parameters to measure and the thresholds for reporting are decided by the network. Cell measurements, also known as cell search, are a complex and computationally expensive. It is also power and time consuming because it comprises computing the correlation between the received signal and known replica of the transmitted signal. Measurements to be performed by the UE for mobility are classified as intra-frequency measurements, inter-layer (in case of hierarchical cell structure deployment), inter-frequency measurements, or inter-RAT measurements. Measurements quantities and reporting events are considered separately for each measurement type. Measurements commands are used by the E-UTRAN to order the UE to start, modify, or stop measurements. In RRC_IDLE state, the UE follows the measurements parameters defined for cell reselection and broadcasted by E-UTRAN. In RRC CONNECTED state, the UE follows the measurements configuration such as MEASUREMENT_CONTROL specified by the radio resource controller (RRC) directed from eNB.

Measurements are classified as gap assisted or non-gap assisted depending on whether the UE needs transmission/reception gaps to perform the relevant measurements. A non-gap assisted measurement is a measurement on a cell that does not require transmission/reception gaps to allow the measurements to be performed. A gap-assisted measurement is a measurement on a cell that does require transmission/reception gaps to allow the measurement to be performed. Gap patterns are configured and activated by the eNB using RRC messages. According to the current 3GPP standards, the UE should not be assumed to be able to carry out inter-frequency neighbor (cell) measurements without measurement gaps. This applies for the following scenarios: (1) different carrier frequencies, bandwidth of the target cell smaller than the bandwidth of the current cell and the bandwidth of the target cell within the bandwidth of the current cell, (2) different carrier frequencies, bandwidth of the target cell larger than the bandwidth of the current cell and the bandwidth of the current cell within the bandwidth of the target cell, (3) different carrier frequencies and non-overlapping bandwidth. While measurements gaps are provided by the eNB for the UEs which need to perform gap assisted measurement for mobility support, measurements may also be performed by the UE during downlink/uplink idle periods that are provided by discontinuous reception (DRX), discontinuous transmission (DTX) or packet scheduling.

When the UE is camped on any cell state, the UE attempts to receive and measure signals including quality indicators from the inter-frequency or inter-RAT cell indicated in the measurement control message or broadcasted as system information of the serving cell. In order to receive and measure these signals and quality indicators the UE detects, synchronizes, and/or monitors the indicated inter-frequency and inter-RAT cells. UE measurement activity is also controlled by measurement rules that allow the UE to limit its measurement activities if certain conditions are fulfilled. According to 3GPP standards, the UE shall be able to identify new inter-frequency cells and perform signal strength measurements of identified inter-frequency cells if carrier frequency information is provided by the serving cell. This applies to both E-UTRA and UTRA technologies. In the case of E-UTRA, the UE is required to measure RSRP and RSRQ measurements of at least four inter-frequency identified cells per E-UTRA carrier. There is also a requirement on the UE to monitor up to at least 3 E-UTRA carriers. This means in total, an E-UTRA UE shall be capable of measuring at least 12 inter-frequency cells. Similarly, an UTRA UE is required to monitor 32 inter-frequency cells, including cells on maximum 2 additional carriers. RSRP and RSRQ are analogues to UMTS CPICH Echo and CPICH RSCP measurements, respectively. The specifications also put constraints on how often these measurements should be performed.

An LTE compliant UE performing inter-RAT measurements (the UE is served by LTE cell and is required to perform measurements on UMTS cell) for example, for UTRAN and GERAN, or inter-frequency measurements (the UE is served by LTE cell and is required to perform measurements on LTE cell) for example, for E-UTRAN, is required to tune away. Similarly, a UMTS compliant UE performing inter-RAT measurements (the UE is served by UMTS cell and is required to perform measurements on LTE cell), or inter-frequency measurements (the UE is served by UMTS cell and is required to perform measurements on LTE cell) needs to do measurements to support the handover process. Performing the measurements requires assignment of measurement gaps and the UE going into compressed mode and tuning away. In either case, tuning away by the UE creates communication gaps that affect the quality of service and effective throughput.

In order to perform the measurements, the UE needs to receive and measure signals including quality indicators from the inter-frequency or inter-RAT cell indicated in the measurement control message or broadcasted as system information of the serving cell. Such reception and measurement involves detecting, synchronizing and/or monitoring the indicated inter-frequency and inter-RAT cells. This well-defined multi-step process of detecting, synchronizing, and monitoring the cells can be done in the time domain or the frequency domain. This type of processing can be performed in real time or offline. In the offline mode, the data is captured, stored, and then processed in parallel.

As noted above, in a UMTS network, a UE measures received signal strength indicator (RSSI), common pilot channel (CPICH) received signal code power (RSCP), and CPICH Ec/No. In a LTE network, the UE periodically performs downlink radio channel measurements based on reference signals (RS) received from cells. The RS in LTE is similar to the pilot in WiMAX. The UE measures two parameters on the RS: reference signal received power (RSRP) and the reference signal received quality (RSRQ).

RSRP is a RSSI type of measurement. It measures the average received power over the resource elements that carry cell-specific reference signals within a certain frequency bandwidth. RSRQ is a C/I type of measurement and it indicates the quality of the received reference signal. RSRQ is defined as (N*RSRP)/(E-UTRA Carrier RSSI), where N makes sure the nominator and denominator are measured over the same frequency bandwidth. The carrier RSSI measures the average total received power observed only in OFDM symbols containing reference symbols for antenna port 0 (i.e., OFDM symbol 0 & 4 in a slot) in the measurement bandwidth over N resource blocks.

The total received power of the carrier RSSI includes the power from co-channel serving & non-serving cells, adjacent channel interference, thermal noise, etc. RSRP is applicable in both RRC_IDLE and RRC_CONNECTED modes, while RSRQ is only applicable in RRC_CONNECTED mode. RSRP is used in the procedure of cell selection and cell reselection in idle mode. RSRP and/or RSRQ are used in the procedure of handover. It is implementation specific.

A UE makes periodic measurements of RSRP and RSRQ based on the RS received from the serving cell and from adjacent cells. For RSRP determination the cell-specific reference signals Ro is used. If the UE can reliably detect that R1 is available it may use R1 in addition to Ro to determine RSRP.

Figure 5:
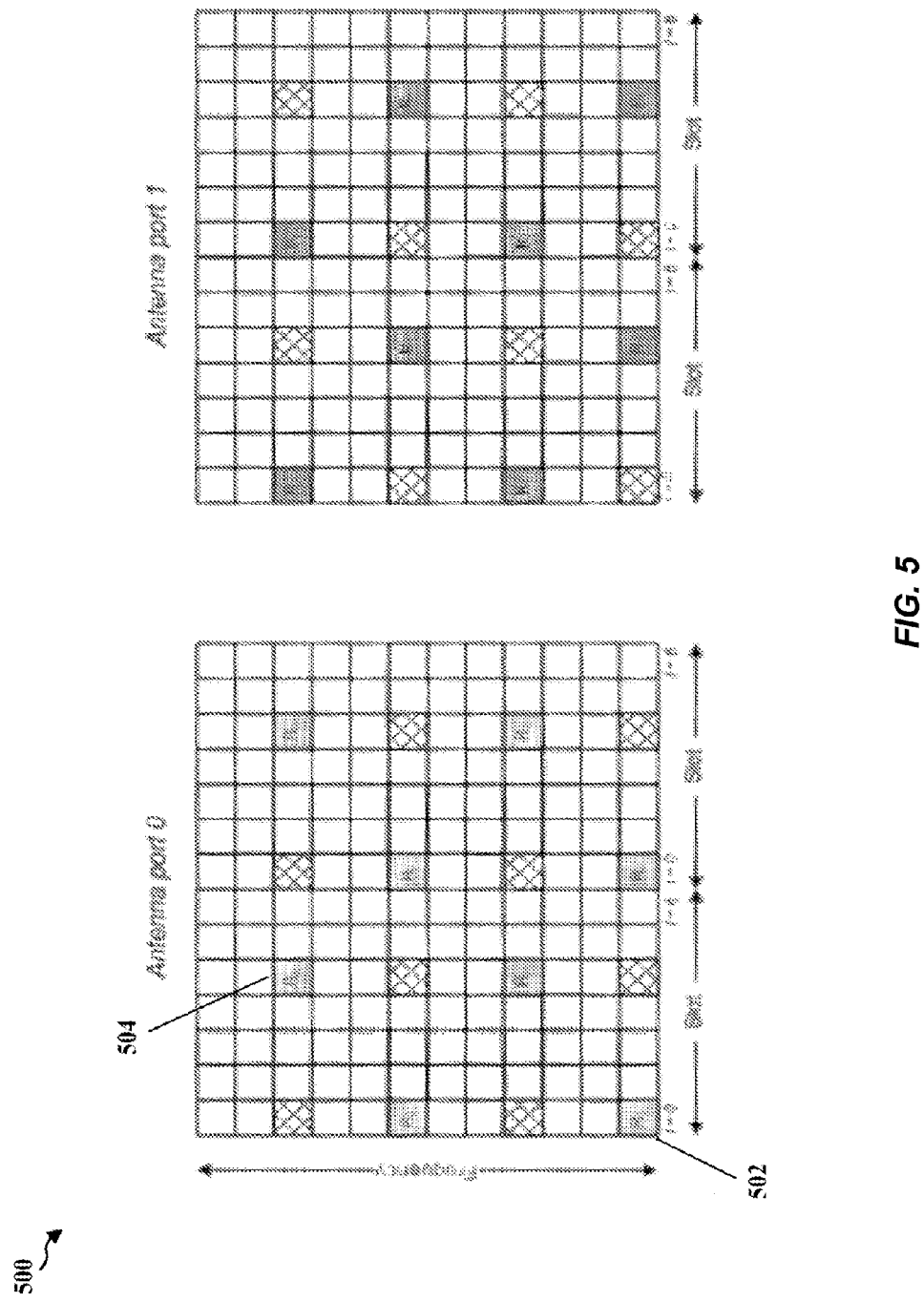
FIG. 5 is an illustration of the downlink reference signal structure.

FIG. 5 is an illustration of the downlink RS structure 500 for channel estimation, CQI measurement, and cell search/acquisition. Reference symbols (R) are located in the 1st OFDM symbol (1st R) 502 and 3rd to last OFDM symbol (2nd R) 504 of every subframe.

An LTE compliant UE may be required to handover to another LTE network in a different frequency/band (an inter-frequency handover) or to a non-LTE network, such as a UMTS network (an inter-RAT handover). An LTE complaint UE needs to do measurements over LTE in different frequency/band and non-LTE networks to support the handover process. As stated above, in order to perform handover measurements, the LTE compliant UE may require the assignment of measurement gaps. Measurements gaps are assigned time intervals when the UE is free to perform measurement procedures on different radio access technology (RAT) transmission or different frequency/band. During measurement gaps, no data is transmitted between the serving base station (eNB) and the UE. It is desirable for an LTE compliant UE to measure cells in the same frequency without the use of measurement gaps.

Similarly, a UMTS compliant UE may be required to handover to another UMTS network in different frequency/band (an inter-frequency handover) or to a non-UMTS network, such as a LTE network (an inter-RAT handover). A UMTS compliant UE can measure cells in the same frequency without the use of measurement gaps in compressed mode.

Figure 6:
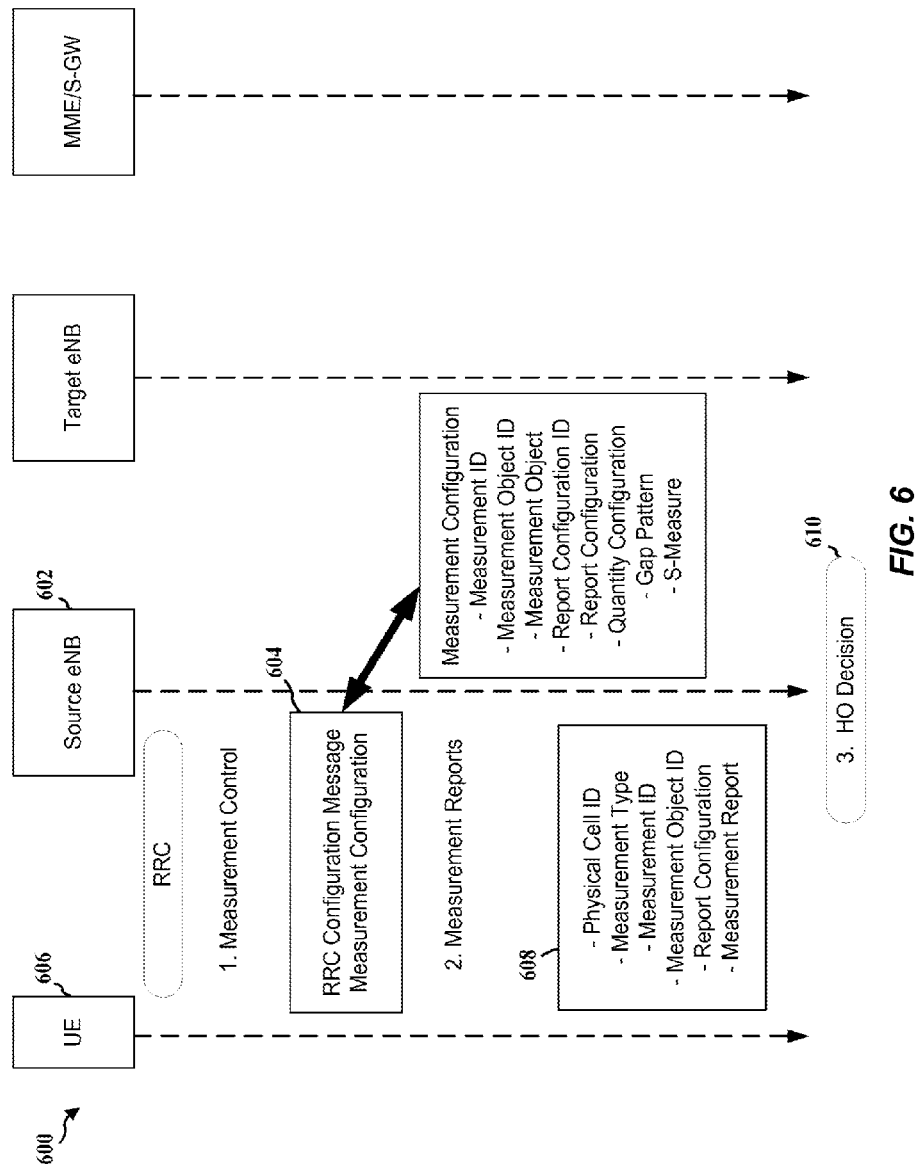
FIG. 6 is a diagram illustrating messages used during the measurement phase of a conventional handover process.

FIG. 6 is a diagram 600 illustrating messages used during the measurement phase of a conventional handover process. In the process, a source eNB 602 sends a configuration message 604 to a UE 606. The configuration message 604 tells the UE how to report the specific measurements. Included in the configuration message 604 is a gap pattern parameter, which defines the measurement reporting gap (time) intervals, assuming DRX mode of operation. During these measurement gap intervals, the UE 606 temporarily ceases communicating with the source eNB 602 in order to perform the measurements requested in the configuration message 604. After obtaining the requested measurements, the UE 606 sends a measurement report message 608 to the source eNB 602. The source eNB 602 uses the information in the measurement report message 608 to make a hand over (HO) decision 610.

Figure 7:
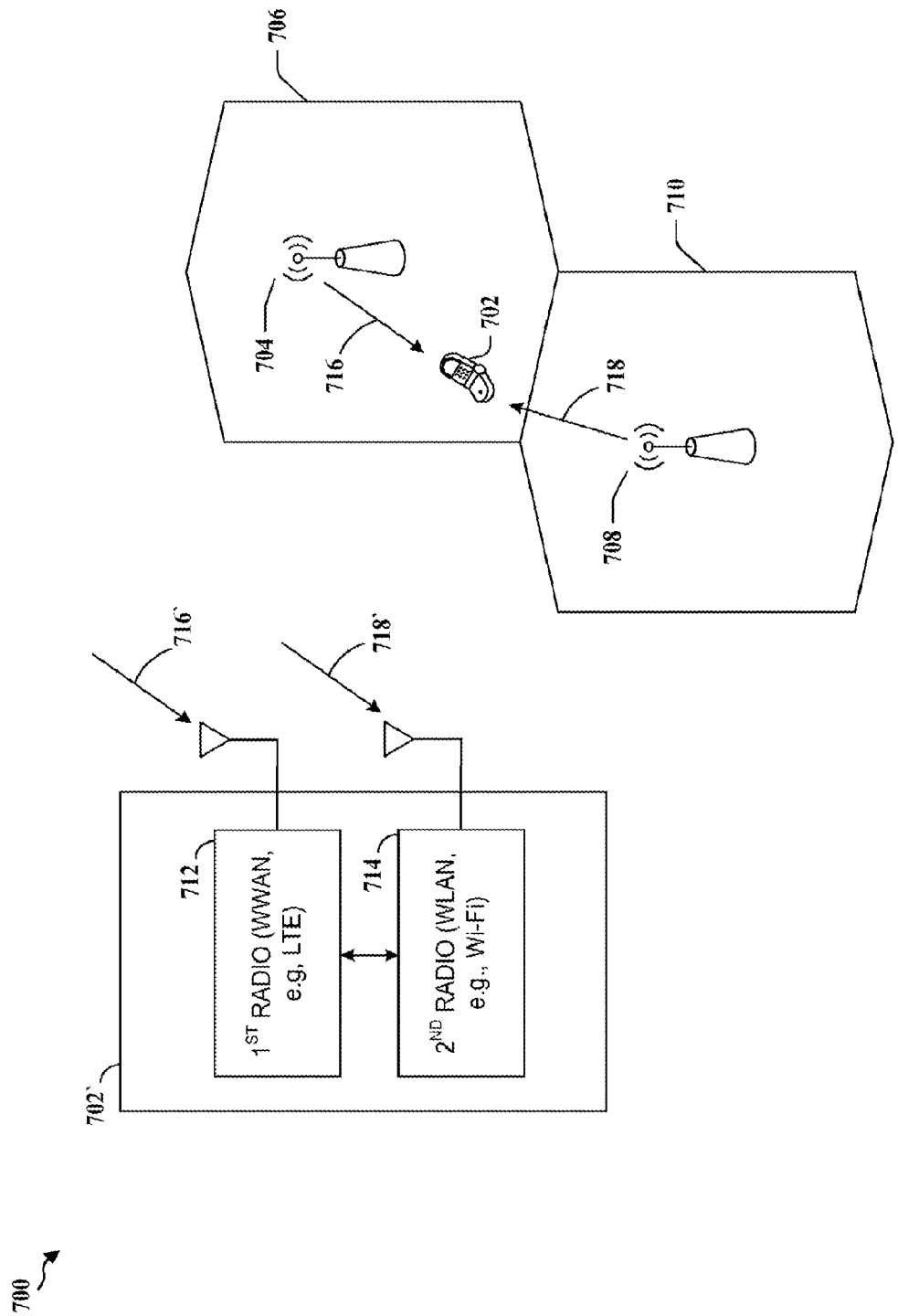
FIG. 7 is a diagram illustrating an implementation of the measurement phase of a handover process that avoids gaps in communication between a UE and its serving cell.

FIG. 7 is a diagram 700 illustrating an implementation of the measurement phase of a handover process that avoids gaps in communication between a UE and its serving cell. In this implementation, a second radio of the UE is used to carry out the measurements, thereby obviating the use of gap patterns as shown in FIG. 6. A first radio of the UE temporarily configures a second radio of the UE to do these measurements. This is feasible since mobile devices have multiple radios designed to work on different networks. For example, the E-UTRAN and WCDMA radios are designed to work on wireless wide area networks (WWAN) while 802.11 radios are designed to work on wireless local area networks (WLAN). These WLAN radios implement an FFT engine as part of their normal operation. The FFT engine can be used to perform measurements on the downlink of WWAN networks, and hence eliminates the need for configuring the wireless device with measurement gaps.

A UE 702 is shown communicating with a first eNB 704 within a serving cell 706 adjacent a second eNB 708 within a neighboring cell 710. The UE 702, 702' includes a first radio 712 that is based on a first radio technology, e.g., a radio technology that implements a wireless wide area network (WWAN), such as LTE or UMTS. The UE 702, 702' also includes a second radio 714 that is based on a second radio technology that is different from the first radio technology, e.g., a radio technology that implements a wireless local area network (WLAN), such as Wi-Fi. The second radio 714, however, is configured or configurable to receive signals transmitted based on a radio technology different from the second radio technology, from a neighboring cell operating on a different frequency.

For example, the FFT engines of a second radio can be configured to perform measurements on the downlinks of a WWAN network. It is thus feasible to reconfigure a WLAN radio, such as a Wi-Fi radio (which is an OFDM based radio), to receive signals transmitted based on LTE technology. As such, the second radio 714 may perform the above-mentioned E-UTRAN and handover measurements, while the first radio 712 remains on its current carrier frequency and continues to communicate in the serving cell. In this simultaneous, dual radio mode of operation, undesirable communication gaps are avoided as communication of the first radio with the serving cell is uninterrupted.

In this implementation, the first radio 712 of the UE 702 receives a command 716, 716' from the eNB 704 of the serving cell 706. The first radio 712 configures the second radio 714 to receive signals 718, 718' transmitted by the second eNB 708 in the neighboring cell 710 and extract a quality indicator from the received signal 718, 718'. This mode of operation requires tight cooperation between the first radio 712 and the second radio 714. To this end, the first radio 712 and the second radio 714 are configured to communicate with each other to allow for parallel, i.e., simultaneous, operation of the radios and configuration of the second radio as needed.

Figure 8:
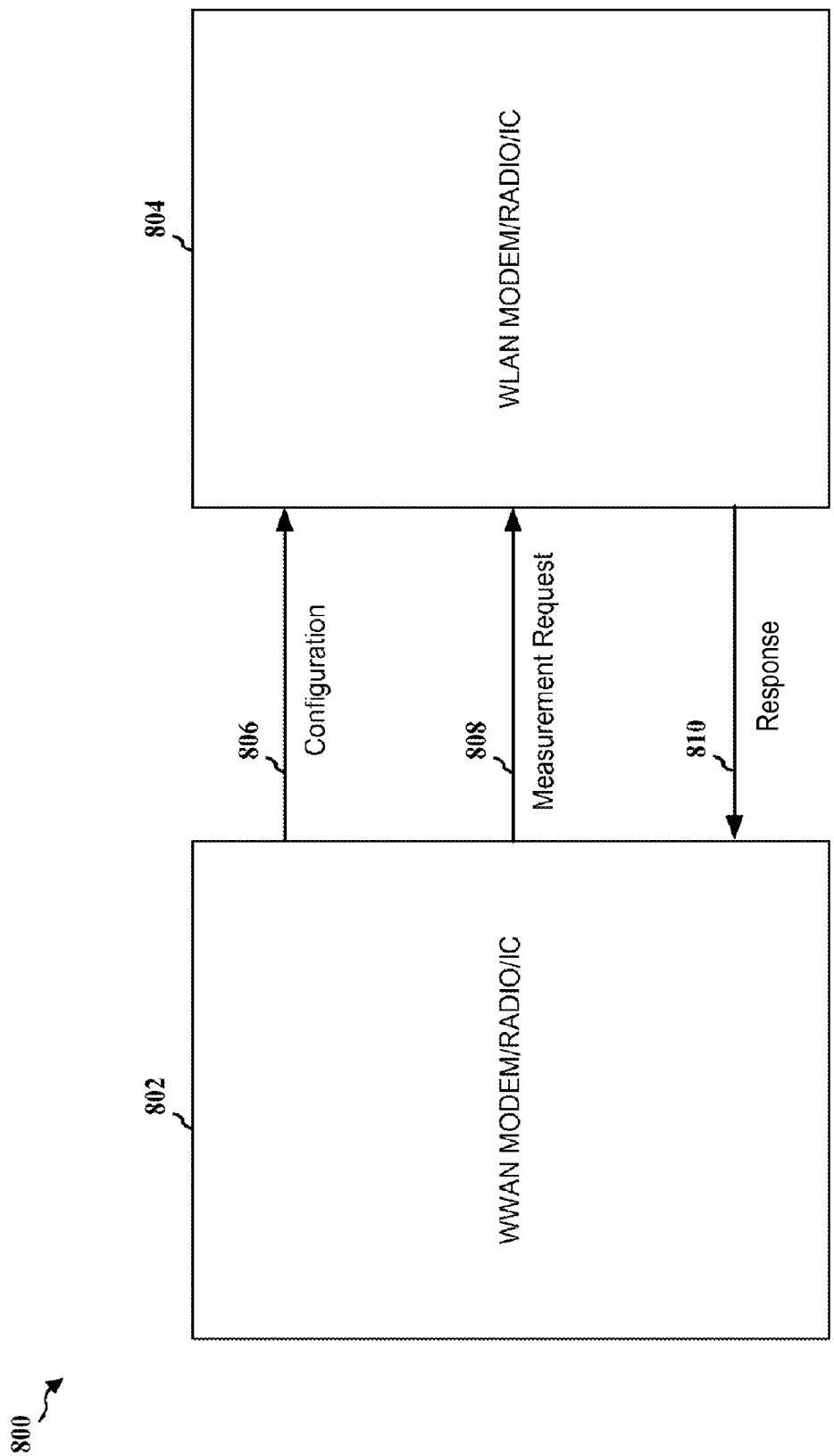
FIG. 8 is a diagram illustrating communication between a first radio and a second radio of a UE.

FIG. 8 is a diagram 800 illustrating communication between a first radio 802 and a second radio 804 of a UE. When the first radio 802 communicating with the serving cell receives a command from the E-UTRAN of the serving cell ordering the UE to perform quality measurements of a neighboring cell, the first radio 802 outputs a configuration command 806 to the second radio 804, which initiates reconfiguration of the second radio to a radio technology different from its primary radio technology. The configuration command provides the second radio with information that allows the second radio 804 to receive and measure signals including quality indicators from the neighboring cell. The command includes, but is not limited to number of FFT points, spacing between subcarriers, sampling frequency, center frequency, and bandwidth.

The first radio 802 also outputs a measurement request command 808 to the second radio 804. The request command 808 tells the second radio 804 which measurements to obtain. The second radio 804 receives and measures signals including quality indicators from the inter-frequency or inter-RAT cell indicated in the measurement request message. Such reception and measurement involves detecting, synchronizing and/or monitoring the indicated inter-frequency and inter-RAT cells. Detection, synchronization, and monitoring may be done in either the frequency domain or time domain. The processing can also be performed in real time or offline. In the offline mode, the data is captured, stored, and then processed.

When measurements are obtained by the second radio 804, the second radio outputs a response 810 (e.g., data measurement, acquired data, processed data, etc.) to the first radio 802. In particular embodiments, the response message includes, but is not limited to, Physical Cell ID, Measurement Type, Measurement ID, Measurement Object ID, Report configuration ID, and Measurement report.

Subsequently, the first radio 802 communicating with the serving cell may receive a command from the E-UTRAN of the serving cell ordering the UE to stop quality measurements of a neighboring cell. In this case, the first radio 802 initiates reconfiguration of the second radio 804 back to its primary radio technology by sending another configuration command 806.

Figure 9:
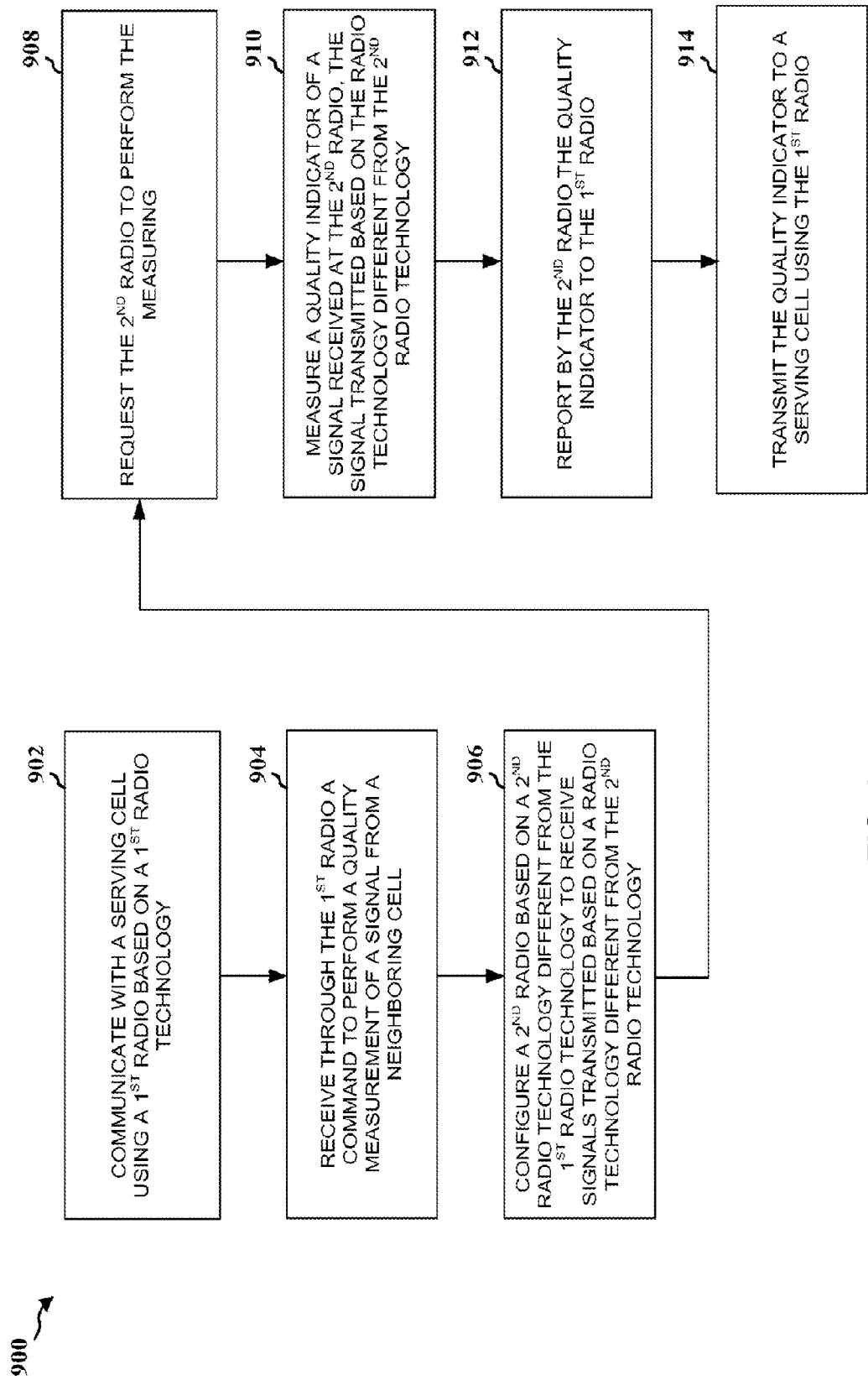
FIG. 9 is a flow chart of a method of wireless communication.

FIG. 9 is a flowchart 900 of a method of wireless communication. The method may be performed by a UE having a first radio based on a first radio technology and a second radio based on a second radio technology that is different from the first radio technology, such as described above with respect to FIG. 7. At step 902, the first radio of the UE communicates, for example, by receiving signals transmitted based on the first radio technology from a serving cell. The first radio technology may be WWAN technology such as LTE or UMTS.

At step 904, the first radio of the UE receives a command from the serving cell to perform a measurement of a neighboring cell in order to obtain a quality indicator for the neighboring cell. In the case of a LTE based neighboring cell, the quality indicator may include, for example, one or more of a RSRP, a RSRQ, and a single to interference plus noise ratio (SINR). In the case of an UMTS based neighboring cell, the quality indicator may include, for example, one or more of a RSSI, CPICH-RSCP, and CPICH Ec/No.

At step 906, the first radio of the UE configures a second radio that is based on a second radio technology to receive signals transmitted based on a radio technology different from the second radio technology. The second radio technology may be a WLAN technology, such as WiFi. The radio technology different from the second radio technology may be the same radio technology associated with the first radio or it may be a third radio technology that is different from both the first and second radio technologies. For example, in the case where the first radio technology is LTE and the second radio technology is WiFi, the second radio may be reconfigured to receive signals transmitted in accordance with LTE based radio technology for inter-frequency measurement purposes, or reconfigured to receive signals transmitted in accordance with UMTS for inter-RAT measurement purposes. In the case where the first radio technology is UMTS and the second radio technology is WiFi, the second radio may be reconfigured to receive signals transmitted in accordance with LTE based radio technology for inter-RAT measurement purposes, or reconfigured to receive signals transmitted in accordance with UMTS for inter-frequency measurement purposes. As described above, reconfiguration of the second radio is done through a configuration command sent by the first radio to the second radio.

At step 908, the first radio of the UE requests the second radio to perform the measuring. It is noted that while reconfiguration of the second radio is described herein prior to the request for the second radio to perform the measurement, these steps may be performed in either order or at the same time. In other words, the request to measure and configuration of the second radio may be considered as occurring in either order or essentially simultaneously.

At step 910, the second radio of the UE measures a quality indicator of a signal received from a neighboring cell at the second radio. This signal, e.g., reference signal (RS), is transmitted based on the radio technology different from the second radio technology. The measuring involves detecting and synchronizing signals received by second radio from the neighboring cell and extrapolating therefrom, the appropriate quality indicators, such as RSRP, RSRQ, or SINR (for LTE) or RSSI, CPICH-RSCP or CPICH Ec/No (for UMTS). Detection and synchronization may be done in either the frequency domain or time domain. The processing can also be performed in real time or offline. In the offline mode, the data is captured, stored, and then processed.

At step 912, the second radio of the UE reports the quality indicator to the first radio by sending a response message to the first radio. As describe above with reference to FIG. 10, the response message may include, but is not limited to, Physical Cell ID, Measurement Type, Measurement ID, Measurement Object ID, Report configuration ID and Measurement report.

Finally, at step 914 the first radio of the UE transmits the quality indicator to an eNB in the serving cell using the first radio based on the first radio technology (UMTS or LTE). The eNB uses the quality indicator to determine whether a handover should occur.

Figure 10:
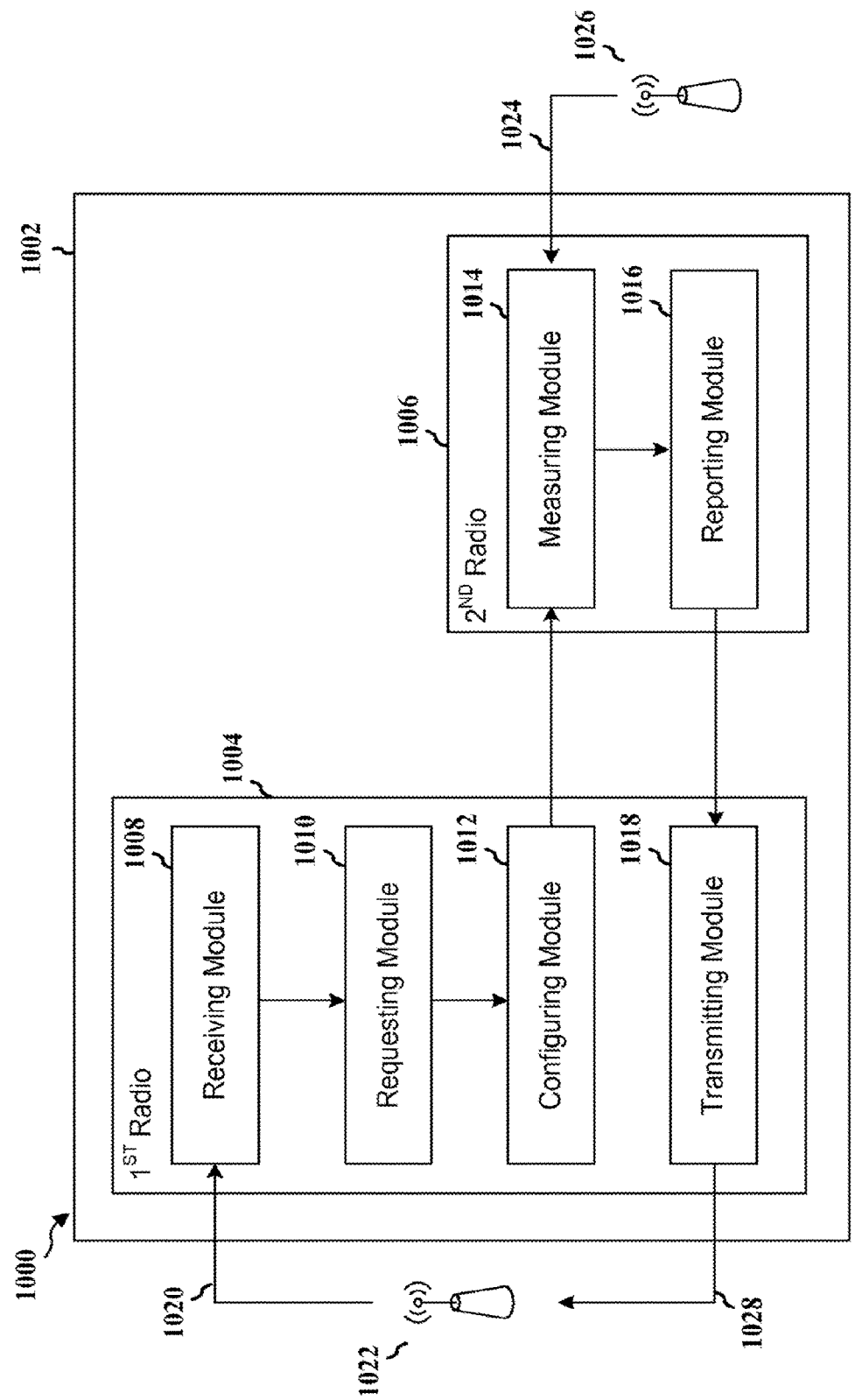
FIG. 10 is conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The apparatus 1002 includes a first radio module 1004 that is based on a first radio technology and a second radio module 1006 that is based on a second radio technology that is different from the first radio technology. The first radio module 1004 includes a receiving module 1008 that receives a command to perform the measuring operation described above with reference to FIG. 9. The command is received through a signal 1020 transmitted from equipment 1022, e.g., eNB, within the serving cell of the apparatus 1002 and is received using the first radio based on the first radio technology.

The first radio module 1004 also includes a requesting module 1010 and a configuring module 1012. The requesting module 1010 requests the second radio 1006 to perform the measurement, while the configuring module 1008 configures the second radio module 1006 to receive signals transmitted based on a radio technology different from the second radio technology.

The second radio module 1006 includes a measuring module 1014 that measures a quality indicator of a signal 1024 received at the second radio module. The signal 1024 is transmitted from equipment 1026 within a neighboring cell and is based on the radio technology different from the second radio technology. The second radio module 1006 also includes a reporting module 1016 that reports the quality indicator to the first radio 1004. The first radio module 1004 further includes a transmitting module 1018 that transmits the quality indicator to the equipment 1022 in the serving cell. The quality indicator is transmitted by a signal 1028 using the first radio based on the first radio technology. One or more of the modules 1008, 1010, 1012, 1018 of the first radio module 1004 function as a communication module that allow for communication using the first radio based on the first radio technology.

The apparatus 1002 may include additional modules that perform each of the steps of the algorithm in the aforementioned flow charts of FIG. 9. As such, each step in the aforementioned flow charts of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
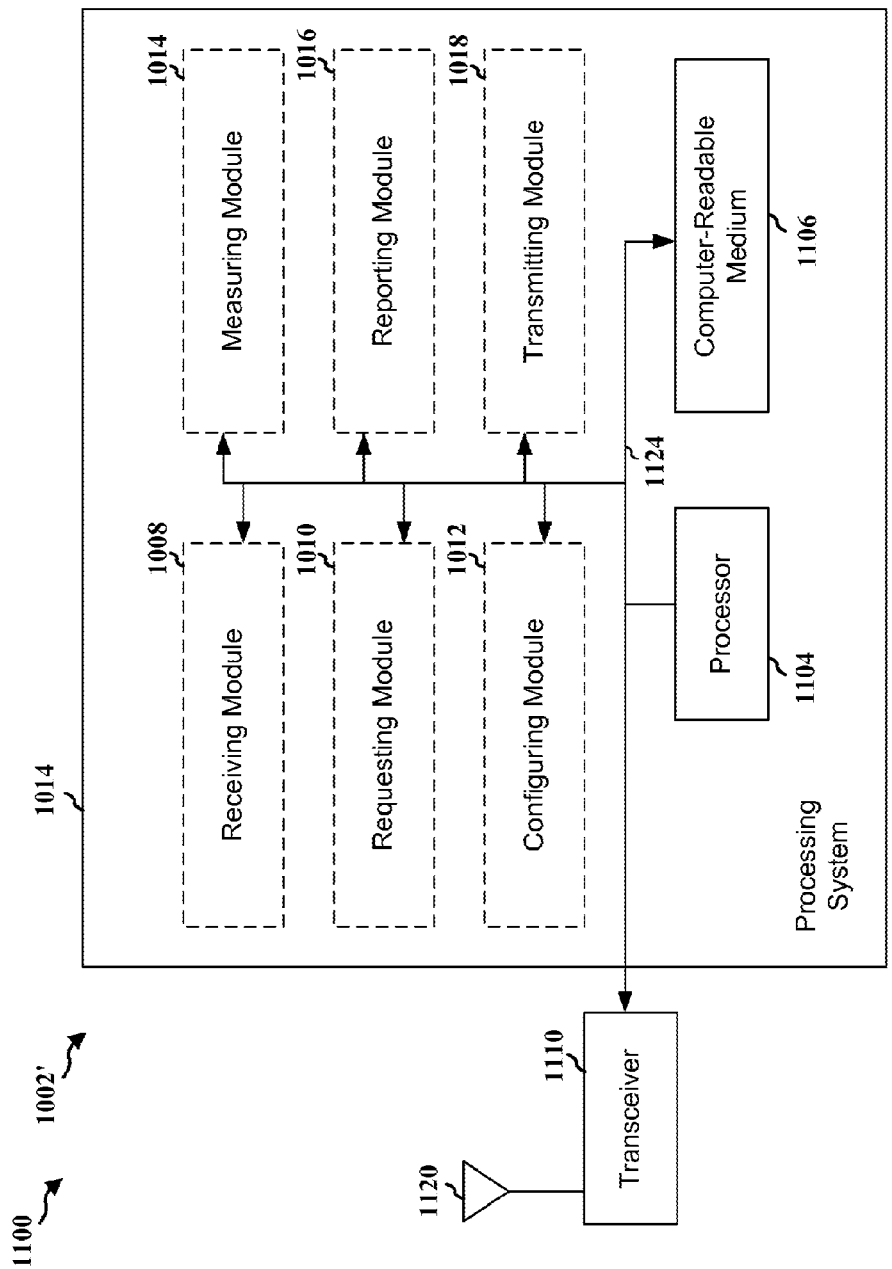
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012, 1014, 1016, 1018 and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, 1010, 1012, 1014, 1016, 1018. The modules may be software modules running in the processor 1104, resident/stored in the computer readable medium 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for communicating using a first radio based on a first radio technology, means for configuring a second radio based on a second radio technology different from the first radio technology to receive signals transmitted based on a radio technology different from the second radio technology, and means for measuring a quality indicator of a signal received at the second radio, the signal transmitted based on the radio technology different from the second radio technology. The apparatus 1002/1002' for wireless communication further includes means for receiving a command to perform the measuring, means for requesting the second radio to perform the measuring, means for reporting by the second radio the quality indicator to the first radio, and means for transmitting the quality indicator to a serving cell using the first radio.

The aforementioned means may be one or more of the aforementioned modules of the apparatus 1002 and/or the processing system 1114 of the apparatus 1002' configured to perform the functions recited by the aforementioned means. As described the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 12:
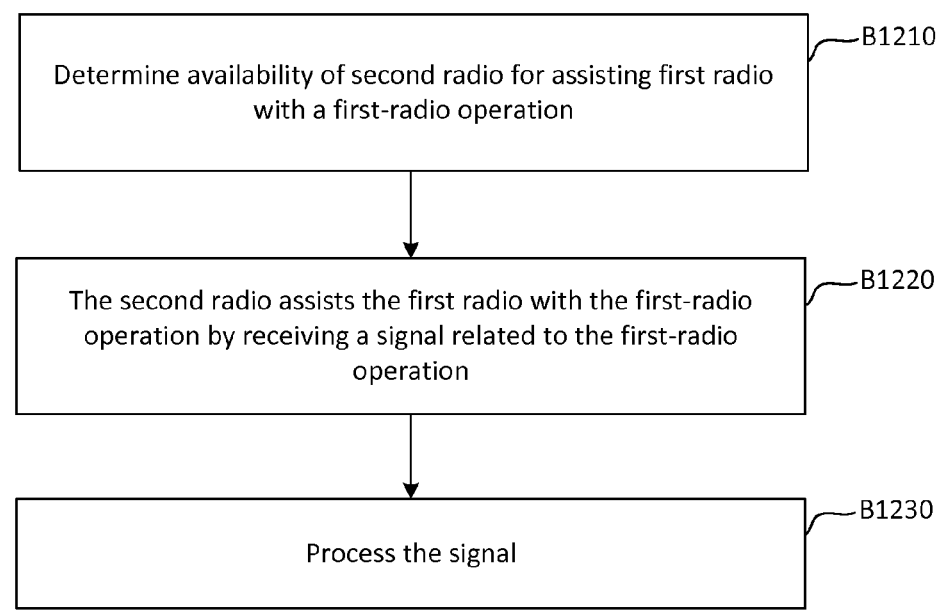
FIG. 12 is a flowchart of a method for coordinating between a first radio and a second radio according to various embodiments of the disclosure.

In various embodiments, in a mobile device (e.g., 606, 702, 702', 1002, 1002' in FIGS. 6, 7, 10, 11), which may also be referred to as a user equipment (UE), apparatus, or the like, having a first radio (e.g., 712, 802, 1004 in FIGS. 7, 8, 10) and a second radio (e.g., 714, 804, 1006 in FIGS. 7, 8, 10), the second radio may assist the first radio with a first-radio operation via coordination between the two radios, for example, as shown by method B1200 in FIG. 12. In particular, the first radio and the second radio of may cooperate to assist the first radio in various first-radio operations. By configuring the second radio for first radio technology, the second radio may perform first-radio operations, including making measurements, estimation, data acquisition, detection, and decoding of first radio signals. First-radio operations may include (but are not limited to) neighboring cell intra-frequency, inter-frequency, inter-RAT measurements; multiple subscriber identity module (SIM) page monitoring and page/data processing; higher order diversity data acquisition and processing; interference avoidance, coordination and mitigation; system information detection and decoding; reference signal time difference (RSTD) measurements; beacon detection for small cell identification; minimization of drive test (MDT) measurements; and speed estimation measurements. Some of the resulting benefits may include increasing UE throughput and system aggregate throughput, improving UE QoS (e.g., voice quality), improving mobility performance (e.g., increase in the handover success rate), reducing or eliminating the need for complicated network management, enabling simultaneous page and data reception on multiple SIMs mobile devices, and/or the like.

With reference to FIG. 1-12, at block B1210, availability of the second radio for assisting the first radio may be determined. For instance, the first radio may send a request for the availability of the second radio, and the second radio may provide a response of its availability to the first radio.

In other embodiments, the second radio may notify the first radio of the availability of the second radio without the first radio requesting such.

At block B1220, the second radio assists the first radio with the first-radio operation. In particular, the second radio may receive or otherwise obtain a signal related to the first-radio operation. This may occur based on an event trigger, such as a network entity (e.g., eNB, serving cell 1022 in FIG. 10) providing a request to the mobile device. For instance, the first radio may provide information (e.g., frequency) to the second radio for performing an operation, such as a measurement or the like, in response to the first radio receiving a measurement request from an eNB. Accordingly, the second radio may perform the measurement based on the provided information. For example, the second radio may tune to the frequency to obtain the measurement.

At B1230, the signal is processed. In some embodiments, the measurements may be processed by the second radio. In other embodiments, the measurements may be reported to the first radio for processing by the first radio. In yet other embodiments, the measurements (or portions thereof) may be processed by both the first radio and the second radio. In further embodiments, the processed results may be provided to the network, for example, by the first radio and/or the second radio.

In some embodiments, the second radio may be configured to assist (i.e., the second radio is available for assisting) the first radio at predetermined events. For instance, the second radio may assist the first radio when the second radio is in a sleep mode, the second radio is in an idle mode, the second radio is in operation and also the second radio supports concurrent operations (e.g., spectral scanning) for assisting the first radio, or other predetermined mode.

In various embodiments, the second radio may be configured to prioritize second radio operation over first radio assistance. For instance, in some embodiments, if the second radio is in use, the second radio does not assist the first radio. Such embodiments may occur for applications such as (but not limited to) Voice-over-Internet Protocol (VoIP). The second radio may assist the first radio once the second radio becomes available (e.g., finishes the current operation). In other embodiments, if the second radio is in use, operation of the second radio may be interrupted to assist the first radio. Such embodiments may for applications such as (but not limited to) data transfers. After assisting the first radio, the second radio may continue the operation that was interrupted In particular embodiments, a cooperative first-radio operation may indicate to a second radio medium access channel (MAC), a channel utilization time and a QoS attribute (e.g., latency budget within which measurements are to be performed). The channel utilization time may be the time for taking first radio measurements plus some overhead. The second radio MAC may treat first-radio operation as another flow. When the first-radio operation flow is scheduled, the second radio will send CTS (clear to send)-to-self with network allocation vector (NAV) set to the channel utilization time. This ensures there is no second radio interference from other devices during the first-radio operation by the second radio. Once the first-radio operation is completed, the channel becomes available for normal second radio operation.

In various embodiments, the first radio operates in at least two modes: a normal mode (or first mode) in which the first radio performs all first-radio operations (with one or more first radio antennas, some of which may be shared); and a cooperative mode (or second mode) in which the second radio assists the first radio with at least one first-radio operation.

Likewise, the second radio may be configured to correspond with the operating modes of the first radio. For instance, the second radio may include one or more configurations and/or parameters for radio frequency (RF) filters, automatic gain control (AGC) loops, clocks, and PHY algorithms associated with each mode. In particular embodiments, the second radio may include one or more configurations and/or parameters for each first-radio operation for which the second radio may assist the first radio. For instance, when assisting the first radio with a first first-radio operation (e.g., MDT measurements), the second radio may include a first configuration(s) and/or parameter(s), and when assisting the first radio with a second first-radio operation (e.g., RSTD measurements), the second radio may include a second configuration(s) and/or parameter(s).

In some embodiments, switching between the at least two modes of operation for the first radio may be based on one or more factors, such as a channel condition. For example, due to the nature of the wireless channel between first radio and the network, if the channel has rank that is greater than 1 indicating that communication with multiple antennas can be sent reliably with the first radio, then the first-radio operation will be performed by the first radio. That is, the first radio remains in the normal mode of operation without soliciting assistance from the second radio. If channel rank is 1, the first-radio operation may be performed (or otherwise assisted) by the second radio. That is, the first radio switches to the coordination mode of operation.

Another example is a scenario where a high data rate application is being communicated over the first radio and the mobile device needs to make inter-frequency measurements (with measurement gaps) due to degrading signal strength. In this case, the first radio may employ the assistance of the second radio in making such measurements so as ensure that throughput of the high data rate application is not impacted by measurement gaps required for measurements. On the other hand, if a low data rate application is being communicated over the first radio and the throughput of that application is not a concern, then the first radio may not request assistance from the second radio and choose to perform inter-frequency measurements with the measurement gaps.

The switch in mode of operation may be communicated to the network (e.g., eNB) in any suitable manner. In particular embodiments, UE capability changes (e.g., need for measurement gaps) are communicated to the eNB. In some embodiments, the switch may be performed via a dynamic radio resource controller (RRC) signal between the UE and the eNB. In some embodiments, existing indicators (e.g., rank indicator (RI)) may be used for switching the mode of operation.

As described in the disclosure, according to various embodiments, the second radio may be configured to assist (the first radio) with a first-radio operation, such as neighboring cell inter-frequency and inter-RAT measurements. Accordingly, the first radio (WWAN radio) stays on the serving carrier while the UE searches and measurements are made at least in part by the second radio (WLAN radio). The neighboring cell measurements that could be taken on the WLAN radio include, for example, bandwidth and RSSI estimation, timing determination (slot and frame timing determination with synchronization channels), reference signal strength measurements (e.g., RSRP, RSRQ, etc.), and/or the like. In further embodiments, neighboring cell intra-frequency measurements may be made. As such, various embodiments prevent or mitigate throughput loss and degraded mobility performance. In particular, such embodiments may improve QoS (e.g., increase throughput), increase network performance (e.g., increase system throughput, decrease network signaling, etc.), improve mobility performance (e.g., increase handover success rate), minimize network management (e.g., cost, power consumption, etc.).

In some embodiments, the second radio may be configured to assist in making intra-frequency, inter-frequency and inter-RAT measurements in carrier aggregation scenarios when all receive chains in the first radio are used up and these measurements are required. In this case, the second radio may assist in making the neighboring cells measurements.

Figure 13A:
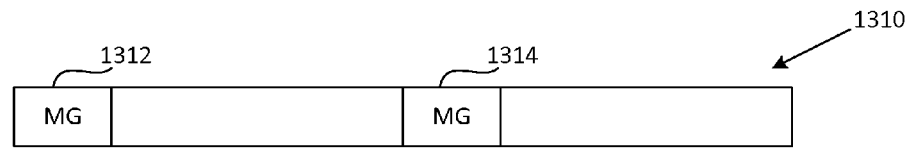
FIG. 13A is a diagram of a measurement gap.
Figure 13B:
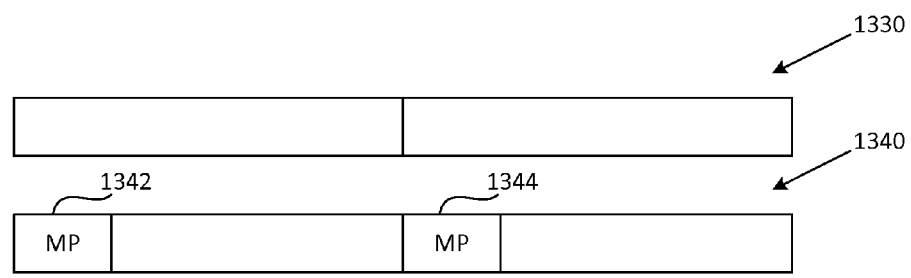
FIGS. 13B-13C are diagrams of measurement gaps according to various embodiments of the disclosure.
Figure 13C:
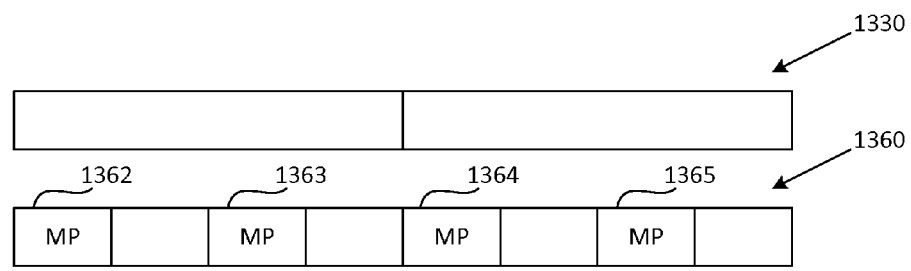

FIG. 13A illustrates an example 1310 of a prior art system in which the first radio performs measurements in measurement gaps 1312, 1314. In such embodiments, the first radio must tune away from its carrier at the measurement gaps 1312, 1314. In various embodiments, because the second radio may assist the first radio by performing the measurements (e.g., at 1342, 1344) instead of the first radio, the first radio may be relieved (e.g., 1330) from taking measurements, as shown, for example in FIG. 13B. As such, the first radio may not need to tune away from its carrier. As in other embodiments, the UE may be scheduled in downtime and the UE can send HARQ ACK/NAK for uplink transmissions but due to measurement gaps these uplink messages may be delayed. In these cases, the second radio may be configured to take more measurements (e.g., at 1362, 1363, 1364, 1625) than the first radio would have otherwise taken, as shown for example in FIG. 13C, thus providing more throughput for the uplink transmissions.

In some embodiments, the second radio reports the measurements to the first radio for processing thereof. Accordingly, the first radio may report the processed measurements to the network (e.g., eNB). In other embodiments, the second radio processes the measurements. The second radio may provide the processed measurements to the first radio and/or the network.

In various embodiments, the second radio assists the first radio with a first-radio operation to enhance the capability of the mobile device (or UE). Measurement gaps may include scheduled gaps (gap-assisted measurements) and autonomous gaps (non-gap-assisted measurements). Scheduled gaps are configured by the network (e.g., eNB), which configures a gap pattern and provides the gap pattern to the mobile device (e.g., via RRC dedicated signaling). The mobile device may create autonomous gaps to perform measurements when the mobile device temporarily aborts communication with all serving cells. A non-gap-assisted measurement is a measurement on a cell that does not require transmission/reception gaps. A gap-assisted measurement is a measurement on a cell that does require transmission/reception gaps. Whether a measurement is non-gap assisted or gap assisted depends on the capability of the mobile device and current operating frequency of the mobile device. The mobile device determines whether a particular cell measurement needs to be performed in a transmission/reception gap, and the scheduler determines whether gaps are needed. Accordingly, for instance, because of the second radio (which can perform the measurements on behalf of the first radio); the mobile device does not need measurement gaps for gap-assisted measurements (e.g., inter-frequency, inter-RAT measurements). Accordingly, the mobile device may be configured to notify the network that the mobile device does not need measurement gaps.

In particular embodiments, the determination that a measurement gap is needed (or not needed) can be established on a per band basis. Thus, for example, the mobile device may indicate to the network that it needs a measurement gap for a first band and no measurement gap for a second band.

In various embodiments, the second radio may be configured to assist the first radio with a first-radio operation, such as multiple-subscriber identity module (SIM) page monitoring and page/data processing. A multiple-SIM mobile device, which supports Dual-SIM Dual Standby (DS-DS) may monitor pages simultaneously on a first SIM card and a second SIM card of the mobile device using the first radio. However, once on an active call (using the first radio) on the first SIM, the first radio may not be able to monitor the pages on the second SIM without interrupting the call. Therefore, pages, calls, or data relating to the second SIM may be missed because the user of the mobile device could not be contacted via the second SIM. Accordingly, in various embodiments, the second radio may be configured to make page and data measurements and/or process this information for the second SIM (and/or other SIMs).

In particular embodiments, when the first SIM is in use, page and data may be collected by the second radio and reported to the first radio for processing (e.g., at the RF signal or digital signal level). In some embodiments, the second radio may process the page and the data. Accordingly, for instance, the second radio may notify (report to) the first radio. Likewise, when the second SIM is in use, the second radio may monitor for page and data for the first SIM. In other embodiments, the second radio may communicate with the network on behalf of the first radio to receive page and data information and then forward the page and data information to the first radio at that time or some later time.

In various embodiments, the second radio may be configured to assist the first radio with a first-radio operation, higher order diversity data acquisition and processing. That is, the second radio may acquire signals and processing data to achieve a higher order diversity for the signal being communicated on the first radio. In particular, the second radio may be configured to acquire the signals that provide an additional diversity path for the first radio. For instance, if the first radio already includes two receiving (RX) antennas, the second radio (via its RX antenna) may be configured to provide an additional diversity path from the two RX antennas of the first radio, thus creating a tri-diversity receiver. With this third diversity path made available by using the antenna on the second radio, the mobile device could either combine the three paths or select the best two paths to be combined for further processing. This higher order diversity signal path could lead to significant gains in throughput and UE QoS. Accordingly, for example, data samples received via the diversity path (the antenna(s) of the second radio) may be combined with the data path of the first radio at the RF signal level or digital signal level (e.g., after an analog-to-digital converter (ADC) or in the digital front end module in the mobile receiver).

In particular embodiments, diversity may be further improved due to the separation between the antenna(s) of the first radio and the antenna(s) of the second radio. In particular, because the antenna(s) of the first radio and the antenna(s) of the second radio may have a significant separation distance on the mobile device, the probability of the second radio diversity path measuring a non-correlation path from the first radio antenna is high. This helps to maximize the diversity in a channel. Improvement is possible regardless of the number of antennas on the first radio; the second radio can always provide another diversity path.

In various embodiments, the second radio may be configured to assist the first radio with a first-radio operation, such as interference management, including avoidance, coordination, mitigation (cancellation) thereof. In particular, the second radio may be configured to obtain (e.g., measure) information relating to interference by in-band interferers or adjacent carrier interferers whose signals are leaking into in-band carriers.

In some embodiments, the obtained information by the second radio may be used for interference avoidance. For example, based on the obtained information by the second radio, the first radio may select another carrier if interference measured by the second radio is too high (e.g., above a predetermined threshold).

In some embodiments, the obtained information by the second radio may be used for interference mitigation or coordination. For instance, the second radio may provide the obtained information relating to an interfering signal to the first radio to assist with interference cancellation techniques implemented by the first radio.

The obtained information may include (but is not limited to) interference bandwidth, number of interferers, frequency location of the interferer(s), power of the bandwidth, and/or the like. Such information may be used to adjust or otherwise configure some of the digital filters (or other components) in the first radio (e.g., the receiver front end (RXFE) module). In particular embodiments, the obtained interference information may configure analog filters for mitigating interference before a signal arrives at the digital baseband In various embodiments, the second radio may be configured to assist the first radio with a first-radio operation, such as system information acquisition, which involves cell timing determination (identifying the cell), broadcast signal acquisition, detection and decoding for purposes, such as E-UTRAN cell global identifier (ECGI) reporting. In addition to basic PCI cell search requirements, a mobile device may be required to identify and report the ECGI of a target cell (e.g., eNB, HeNB, etc.) based on a request from a serving cell ('reportCGI'), for instance, for inbound mobility to a closed subscriber group (CSG) cell and/or for ANR so that the target cell can establish neighbor relationships automatically. Accordingly, in various embodiments, the second radio may be configured to assist (the first radio) with intra-frequency and inter-frequency E-CGI reporting. ECGI reporting requires the mobile device, after identifying the target cell, to detect and decode the broadcast signal, such as a master information block (MIB) and a system information block type 1 (SIB 1) message, and determine the ECGI of the target cell. This ECGI would then be reported back to the network. Thus, in some embodiments, the second radio may be configured to detect and decode the broadcast signal and determine the ECGI of the target cell. In particular embodiments, the second radio may report the ECGI to the network work. In other embodiments, the second radio may report the ECGI to the first radio, which then reports the ECGI to the network. As opposed to using the second radio, the first radio of the mobile device may make autonomous gaps in both downlink reception and uplink transmission for receiving the MIB and SIB 1 message. If autonomous gaps are used for measurement with the purpose of 'reportCGI', the mobile device may identify a new CGI of E-UTRA cell within a predetermined threshold or there maybe degradation to the application on the first radio since autonomous gaps are typically not known to the network.

In various embodiments, the second radio may be configured to assist the first radio with a first-radio operation, such as an inter-frequency reference signal time difference (RSTD) measurement. Instead of the first radio of the mobile device tuning away (thus creating a measurement gap) from a serving frequency and performing inter-frequency OTDOA (Observed Time Difference Of Arrival) measurements on a target frequency, the second radio may be configured to assist the first radio with RSTD measurements to avoid such measurement gaps.

In various embodiments, the second radio may be configured to assist the first radio with a first-radio operation, such as beacon detection for small cell identification (e.g., intra-frequency beacon detection). For instance, the second radio may be configured to assist with detection of a beacon from a CSG cell or the like. The beacon is a signal that includes a low-power pilot signal along with a broadcast signal that forces mobile devices to move from a radio channel of a macro cell (eNB) to a radio channel of a small cell (HeNB) (e.g., femtocell, picocell, etc.). In some embodiments, the second radio may be configured to detect the pilot signal and report to the first radio for decoding of the broadcast signal. In other embodiments, the second radio may be configured to detect both the pilot signal and the broadcast signal.

In various embodiments, the second radio may be configured to assist the first radio with a first-radio operation, such as a minimization of drive test (MDT) measurement. In particular, the second radio may be configured to assist the first radio when the network instructs the mobile device to perform an MDT (logged or immediate) measurement (e.g., location measurements, neighboring cell measurements, data volume measurements, etc.) and send back to the network. In particular, the second radio may perform MDT measurements requested by the network of the first radio on behalf of the first radio. The second radio may process the MDT measurement or report to the first radio for processing thereof.

In various embodiments, the second radio may be configured to assist the first radio with a first-radio operation, such as speed estimation for the mobile device, for instance with respect to intra-frequency, inter-frequency, and inter-RAT scenarios. The speed estimation can be determined by the second radio by measuring a similar signal as the first radio and determining the maximum Doppler in the component of the signal by determining the average crossing rate of the signal or from the phase change rate of the signal. The Doppler information can be then be used to determine an estimate of the speed/velocity. This information can then be passed to the first radio to enhance channel estimation and/or interference management algorithms in the mobile device and/or be used by the network for optimizing mobility performance (e.g., avoid handover to certain cells).

Figure 14:
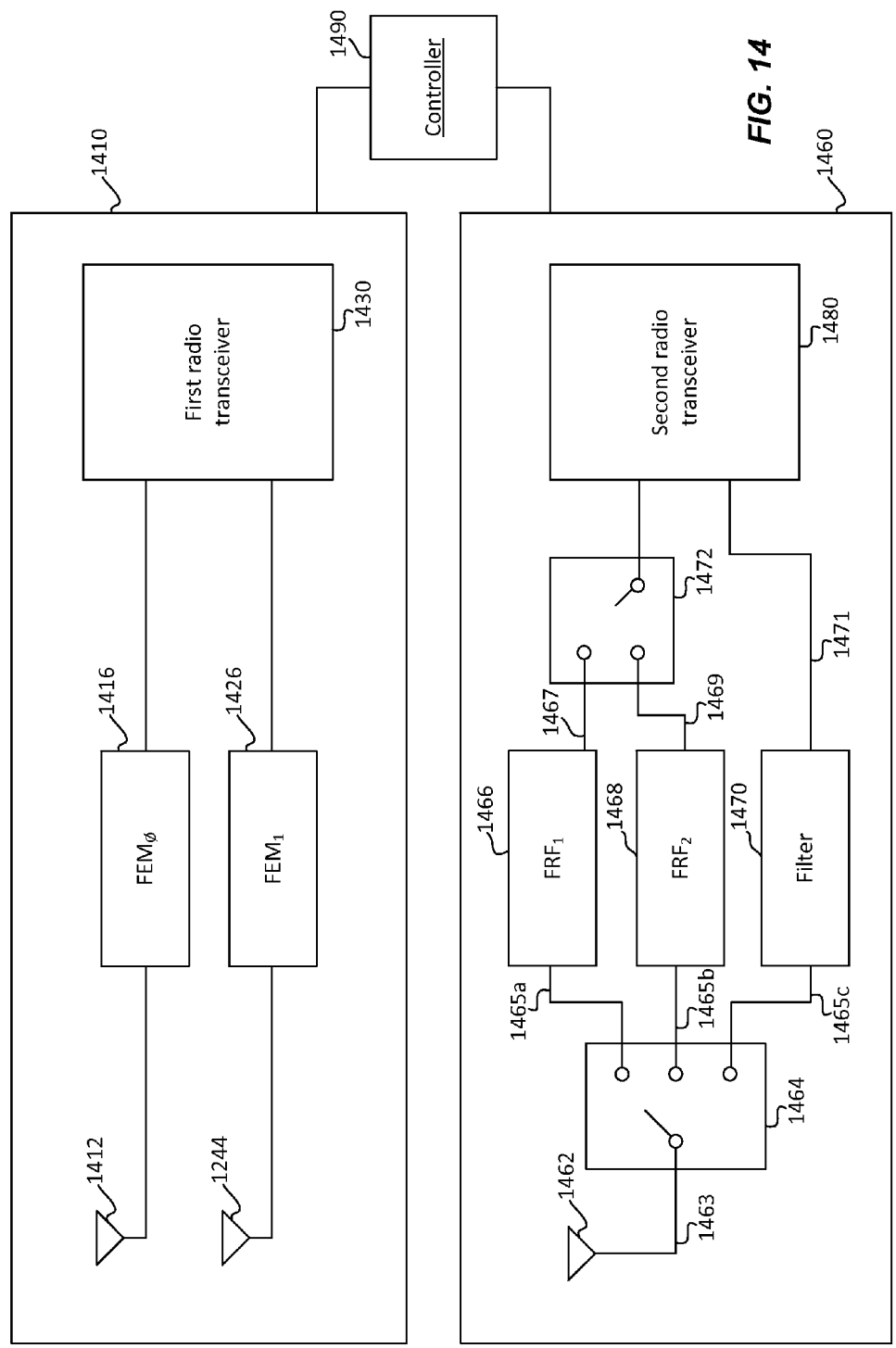
FIG. 14 is a block diagram of a system according to various embodiments of the disclosure.

In various embodiments, the mobile device may be configured to include radio frequency enhancements to allow the second radio to assist the first radio with a first-radio operation. In particular embodiments, the mobile device may be configured to manage transmission by the radios of the mobile device while the second radio assists with the first-radio operation. FIG. 14 illustrates a block diagram of an example of a mobile device 1400 (e.g., 606, 702, 702', 1002, 1002' in FIGS. 6, 7, 10, 11) having a first radio system 1410 (e.g., 712, 802, 1004 in FIGS. 7, 8, 10) and a second radio system 1460 (e.g., 714, 804, 1006 in FIGS. 7, 8, 10). The first radio system 1410 may include a primary antenna 1412 and a diversity antenna 1422. A primary front end module (FEM$_0$) 1416 may be provided between the primary antenna 1412 and a first radio transceiver 1430. A diversity front end module (FEW 1426 may be provided between the diversity antenna 1422 and the first radio transceiver 1430.

The second radio system 1460 may include an antenna 1462. The antenna 1462 may be configured for the first radio and the second radio. For example, the antenna 1462 may be a shared antenna for the first radio (e.g., LTE) and the second radio (e.g., WiFi).

The second radio system 1460 may include a plurality of filters, such as a first first-radio filter (FRF$_1$) 1466 and a second first-radio filter (FRF$_2$) 1468. The first first-radio filter 1466 may correspond to a first band (e.g., band 40 (2300-2400 MHz)), and the second first-radio filter 1468 may correspond to a second band (e.g., band 38 (2570-2620 MHz)) that is at least partially different from the first band. Such filters may help reduce first radio interference.

The second radio system 1460 may also include a third filter 1470, such as an ISM (industrial, scientific, and medical) filter 1470. In some embodiments, the third filter corresponds to a third band (e.g., ISM band (2400-2490 MHz)) that may be at least partially different from one or more of the first band and the second band. A first switch 1464, such as an IP3 (third-order intercept point) switch, may be coupled to the antenna 1462 for receiving a signal 1463 received via the antenna 1462 and selecting which of the filters 1466, 1468, 1470 receives a corresponding signal 1465a-1465c. An output of the ISM filter 1470 may also be coupled to a second radio transceiver 1480 to provide a signal 1471, which corresponds to the signal 1465c (e.g., when the first switch 1464 selects the third filter 1470).

A filtered signal 1467 of the first first-radio filter 1466 (corresponding to the signal 1465a) may be provided to the second radio transceiver 1480 (e.g., when the first switch 1464 selects the first first-radio filter 1466). A filtered signal 1469 of the second first-radio filter 1468 (corresponding to the signal 1465b) may be provided to the second radio transceiver 1480 (e.g., when the first switch 1464 selects the second first-radio filter 1468). In particular embodiments, the mobile device 1400 may include a second switch 1472 coupled to respective outputs of the first first-radio filter 1466 and the second first-radio filter 1468 for selecting the appropriate filtered signal (1467 or 1469) for providing to the second radio transceiver 1480.

In particular embodiments, the mobile device 1400 may include a controller 1490 (e.g., general control of RF (GCRF)) for controlling one or more of the first switch 1464 and the second switch 1472. Thus, according to various embodiments, the mobile device 1400 may be configured to coordinate the first radio and the second radio. For instance, such embodiments may prevent the first radio from transmitting at a same time (and/or a same band) as the antenna 1462 receives a sample (signal) (e.g., performs a measurement) and/or prevent the second radio from transmitting at a same time as the antenna 1462 receives the sample. In other embodiments, the mobile device 1400 may be configured in an suitable manner for coordinating the first radio and the second radio.

In various embodiments, the mobile device may be configured to provide information to the network that notifies the network that the mobile device includes the second radio (a WLAN radio) that may be used to perform first-radio operations. In particular embodiments, the information may include availability of the second radio (e.g., when the second radio is available for assisting the first radio. In further embodiments, the information may include how long the second radio is available for assisting the first radio. Accordingly, in various embodiments, the network may modify measurements gaps based on the information (i.e., a schedule of the second radio). For example, the network will not set up measurement gaps when the second radio is available, and the network may require measurement gaps (for the first radio) when the second radio is not available.

The impact of configuring measurement gaps on uplink LTE (first radio) channels is typically more than a gap length (e.g., 6 ms) of a downlink measurement because of the timing relationships between some of the LTE downlink and the uplink channels (e.g., PDCCH (DCIO), PUSCH, PHICH, etc.). Typically, the maximum loss in throughput due to the mobile device's unavailability to use those uplink channels could be more than the throughput loss on the downlink channels. By using the second radio to make measurements on behalf of the first radio, the unavailability of the mobile device, and thus the throughput loss, can be avoided.

For various applications, such as VOIP, the mobile device may implement transmission time interval (TTI) bundling. TTI bundling may be used to reduce latency, for example, when the mobile device is on an edge of a cell or the like. To reduce latency, a group of TTIs (e.g., 4 TTIs of 1 ms each) may be transmitted without determining whether retransmission is needed at a later time. However, because the TTIs are transmitted without determining whether transmission is necessary, some TTIs will be redundant or otherwise unnecessary. In particular, without assistance of the first radio by the second radio, for example as described in the disclosure, the mobile device can only transmit a part of the TTI bundle that does not overlap with a measurement gap. As such, there may be unnecessary bundle transmission. Thus, by allowing the second radio to assist the first radio to eliminate the measurement gap for the first radio, the TTI bundle in its entirety may be transmitted.

Figure 15:
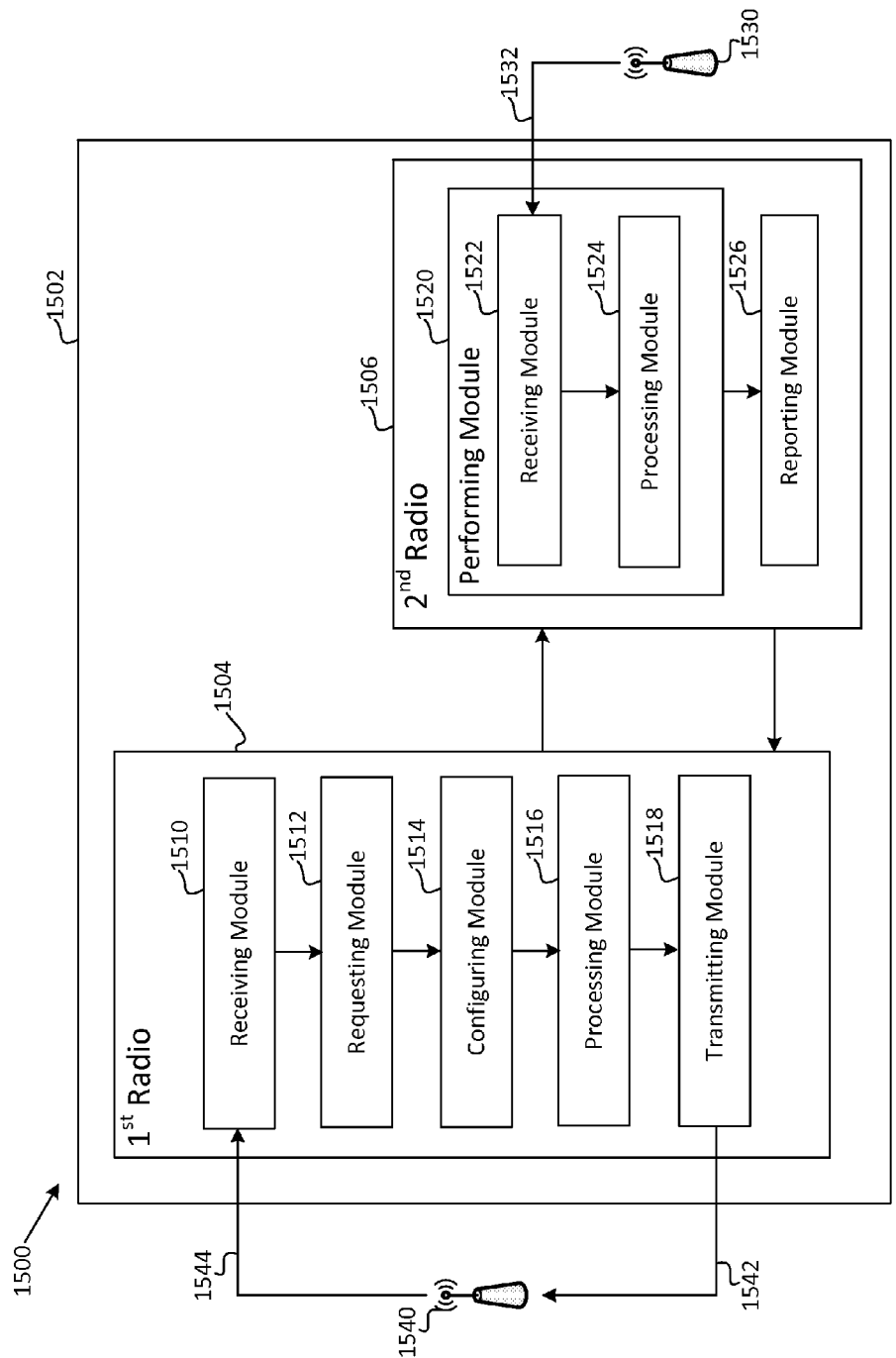
FIG. 15 is conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be a UE (mobile device) (e.g., 606, 702, 702', 1002, 1002', 1400 in FIGS. 6, 7, 10, 11, 14). The apparatus 1502 includes a first radio module 1504 (e.g., 712, 802, 1004, 1410 in FIGS. 7, 8, 10, 14) that is based on a first radio technology and a second radio module 1506 (e.g., 714, 804, 1006, 1460 in FIGS. 7, 8, 10, 14) that is based on a second radio technology that is different from the first radio technology. The first radio module 1504 includes a receiving module 1510 that receives a command to perform a first-radio operation described in the disclosure. The command is received through a signal 1544 transmitted from equipment 1540 (e.g., eNB) of the apparatus 1502 and is received using the first radio module 1504 based on the first radio technology.

In some embodiments, the first radio module 1504 may include a requesting module 1512 and/or a configuring module 1514. The requesting module 1512 requests the second radio 1506 to perform the first-radio operation. In particular embodiments, the requesting module 1512 requests the availability of the second radio module 1506. The configuring module 1514 configures the second radio module 1506 to receive signals transmitted based on a radio technology different from the second radio technology (e.g., the first radio technology).

The second radio module 1506 includes a performing module 1520 that performs at least a portion of the first-radio operation at the second radio module 1506. The performing module 1520 include a receiving module 1522 that receives a signal 1532 related to the first-radio operation. The signal

1532, for example, may be transmitted from equipment 1530 within a neighboring cell or the like and is based on the radio technology different from the second radio technology (e.g., the first radio technology). Accordingly, the second radio module 1506 may be configured to perform a first-radio operation using the first radio technology. For example, if the first radio technology is LTE and the second radio technology is WiFi, the second radio (which is a WiFi radio) may perform an LTE operation on the LTE network. In some embodiments, the performing module 1520 may also include a processing module 1524 for processing the received signal 1532. In such embodiments, the second radio module 1506 may process the received signal 1532 (in alternative of or in addition to the first radio module 1504).

The second radio module 1506 includes a reporting module 1526 that reports the received signal 1532 to the first radio module 1504 for processing thereof, for example, by processing module 1530. In particular embodiments, the processing module 1516 of the first radio module 1504 may be configured by the configuring module 1514. In some embodiments, the reporting module 1526 reports the signal processed by the processing module 1524 to the first radio module 1504.

In some embodiments, the first radio module 1504 further includes a transmitting module 1518 that transmits results corresponding to the processed signal (by the processing module 1524 and/or the processing module 1516) to the equipment 1540 in the serving cell or other network entity. The results are transmitted by a signal 1542 using the first radio module 1504 based on the first radio technology. In other embodiments, the second radio module 1504 includes a transmitting module (not shown) for transmitting results corresponding to the processed signals to the equipment 1540 or other network entity. One or more of the modules 1510, 1512, 1514, 1518 of the first radio module 1504 function as a communication module that allow for communication using the first radio module 1504 based on the first radio technology.

The apparatus 1502 may include additional modules that perform one or more of the features relating to FIGS. 1-15. For instance, each of the steps of the algorithm in the flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A method of wireless communication, comprising:
   receiving signals via a first radio in accordance with a first radio technology;
   determining, by the first radio, an availability of a second radio to perform an operation associated with the first radio technology, wherein the second radio is configured to receive signals in accordance with a second radio technology different from the first radio technology;
   configuring, using a configuration command from the first radio, the second radio to receive signals associated with the first radio technology and measure quality indicators based at least in part on a number of Fast Fourier Transform (FFT) points; and
   performing at least a portion of the operation associated with the first radio technology at the second radio.

2. The method of claim 1,
   wherein the first radio technology is a wireless wide area network (WWAN) technology; and
   wherein the second radio technology is a wireless local area network (WLAN) technology.

3. The method of claim 1, wherein the performing comprises:
   receiving, at the second radio, a signal related to the operation associated with the first radio technology, the signal transmitted based on the first radio technology; and
   processing the received signal.

4. The method of claim 3, wherein the received signal is processed by the second radio.

5. The method of claim 3, wherein the received signal is processed by the first radio.

6. The method of claim 3, wherein a first portion of the received signal is processed by the first radio and a second portion of the received signal is processed by the second radio.

7. The method of claim 1, wherein the operation associated with the first radio technology comprises a measurement of interference affecting a signal in the first radio.

8. The method of claim 1, wherein the operation associated with the first radio technology is from the group consisting of an inter-frequency measurement, an intra-frequency measurement, and an inter-RAT measurement of a neighboring call.

9. The method of claim 1,
   wherein a mobile device comprises at least two subscriber identity modules (SIMs) associated with the first radio; and
   wherein the operation associated with the first radio technology comprises page and data acquisition and processing associated with one of the at least two SIMs.

10. The method of claim 1,
    wherein the performing comprises:
    receiving, at an antenna of the second radio, a signal related to the operation associated with the first radio technology, the signal transmitted based on the first radio technology; and
    processing the received signal as a diversity signal along with signals received by a first antenna of the first radio.

11. The method of claim 10, wherein the received signal is processed by the first radio.

12. The method of claim 1, wherein the operation associated with the first radio technology is a reference signal time difference (RSTD) measurement.

13. The method of claim 1, wherein the operation associated with the first radio technology comprises beacon detection for small cell identification.

14. The method of claim 1, wherein the operation associated with the first radio technology is a minimization of drive test (MDT) measurement.

15. The method of claim 1, wherein the operation associated with the first radio technology is a speed estimation measurement.

16. The method of claim 1, further comprising:
    determining the availability of the second radio for assisting the first radio with the operation associated with the first radio technology,
    wherein the performing is done based on the availability of the second radio.

17. The method of claim 16, wherein the determining comprises:
requesting, by the first radio, the availability of the second radio for assisting the first radio with the operation associated with the first radio technology; and
receiving the availability of the second radio based on the requesting.

18. The method of claim 16, wherein the determining comprises:
receiving the availability of the second radio for assisting the first radio with the operation associated with the first radio.

19. The method of claim 16, wherein the second radio is determined to be available when the second radio is in a sleep mode or idle mode.

20. The method of claim 16, wherein the second radio is determined to be available when the second radio is performing a first type of task and the second radio is determined to not be available when the second radio is performing a second type of task.

21. The method of claim 20, wherein the second radio is configured to stop performing the first type of task in response to a request of the availability of the second radio.

22. The method of claim 16, wherein if the second radio is determined to not be available, the performing is done when the second radio is available.

23. The method of claim 1, wherein the operation associated with the first radio technology is one from the group consisting of a multiple subscriber identity module (SIM) page monitoring and page/data processing, a higher order diversity data acquisition and processing, an interference measurement and management, an E-UTRAN cell global identifier (ECGI) determination and reporting, a reference signal time difference (RSTD) measurement, a beacon detection for small cell identification, a minimization of drive test (MDT) measurement, and a speed estimation measurement.

24. The method of claim 1, wherein the determining comprises requesting, by the first radio to the second radio, the availability of the second radio.

25. The method of claim 24, wherein the determining further comprises providing a response, by the second radio to the first radio, of the availability of the second radio upon receiving a request for the availability at the second radio.

26. The method of claim 25, wherein the configuring and the performing occur in response to the first radio receiving the response of the availability of the second radio.

27. The method of claim 1, further comprising reporting, by the second radio to the first radio, a signal received at the second radio related to the operation associated with the first radio technology, the signal transmitted based on the first radio technology.

28. The method of claim 1, wherein the configuring comprises configuring, by the first radio, the second radio, from receiving signals corresponding to wireless local area networks (WLAN), to receiving signals corresponding to wireless wide area networks (WWAN).

29. The method of claim 1, wherein the configuration command includes at least one from the group consisting of spacing between subcarriers, sampling frequency, center frequency, and bandwidth.

30. A system of wireless communication, comprising:
a first radio configured to communicate in accordance with a first radio technology; and
a second radio configured to receive signals corresponding to a second radio technology different from the first radio technology,
wherein the first radio is further configured to:
determine an availability of the second radio to perform an operation associated with the first radio technology;
configure, using a configuration command, the second radio to receive signals associated with the first radio technology and measure quality indicators based at least in part on a number of Fast Fourier Transform (FFT) points; and
configure the second radio to perform at least a portion of the operation associated with the first radio technology.

31. An apparatus for wireless communication, the apparatus comprising:
a processor; and
a memory containing instructions that, when executed by the processor, cause the apparatus to:
receive signals via a first radio in accordance with a first radio technology;
determine, by the first radio, an availability of a second radio to perform an operation associated with the first radio technology, wherein the second radio is configured to receive signals in accordance with a second radio technology different from the first radio technology;
configure, using a configuration command from the first radio, the second radio to receive signals associated with the first radio technology and measure quality indicators based at least in part on a number of Fast Fourier Transform (FFT) points; and
perform at least a portion of the operation associated with the first radio technology at the second radio.

32. The apparatus of claim 31, wherein execution of instructions to perform further comprise instructions to:
receive, at the second radio, a signal related to the operation associated with the first radio technology, the signal transmitted based on the first radio technology; and
process the received signals.

33. The apparatus of claim 32, wherein the received signal is processed by the second radio.

34. The apparatus of claim 32, wherein the received signal is processed by the first radio.

35. The apparatus of claim 32, wherein the received signal is processed at least partially by the first radio and the second radio.

36. The apparatus of claim 31, wherein the operation associated with the first radio technology comprises a measurement of interference affecting a signal in the first radio.

37. A non-transitory computer-readable storage medium containing programming instructions that, when executed by a processor of a wireless communication apparatus, causes the wireless communication apparatus to:
receive signals via a first radio in accordance with a first radio technology;
configure a second radio to receive signals in accordance with a second radio technology, different from the first radio technology;
determine, by the first radio, an availability of the second radio to perform an operation associated with the first radio technology, wherein the second radio is configured to receive signals in accordance with the second radio technology different from the first radio technology;
configure, using a configuration command from the first radio, the second radio to receive signals associated with the first radio technology and measure quality indicators based at least in part on a number of Fast Fourier Transform (FFT) points; and perform at least a portion of the operation associated with the first radio technology at the second radio.

38. An apparatus for wireless communication, the apparatus comprising:
- means for receiving signals via a first radio in accordance with a first radio technology;
- means for configuring a second radio to receive signals in accordance with a second radio technology different from the first radio technology;
- means for determining, by the first radio, an availability of the second radio to perform an operation associated with the first radio technology, wherein the second radio is configured to receive signals in accordance with the second radio technology different from the first radio technology; and
- means for configuring, by the first radio, the second radio to receive signals associated with the first radio technology and measure quality indicators based at least in part on a number of Fast Fourier Transform (FFT) points.

* * * * *